(12) United States Patent  
Ohta

(10) Patent No.: US 7,775,502 B2
(45) Date of Patent: Aug. 17, 2010

(54) BALL VALVE WITH A ROTATABLE BODY CAPABLE OF BEING KEPT OUT OF SUBSTANTIAL CONTACT WITH A SEAT MEMBER

(75) Inventor: Kozi Ohta, Osaka (JP)

(73) Assignee: Hisaka Works, Ltd., Osaka (JP)

( * ) Notice: Subject to any disclaimer, the term of this patent is extended or adjusted under 35 U.S.C. 154(b) by 340 days.

(21) Appl. No.: 11/906,805

(22) Filed: Oct. 4, 2007

(65) Prior Publication Data
US 2008/0093574 A1  Apr. 24, 2008

(30) Foreign Application Priority Data
Oct. 11, 2006 (JP) .............................. 2006-277768

(51) Int. Cl.
*F16K 5/06* (2006.01)
(52) U.S. Cl. .................. 251/56; 251/163; 251/188; 251/192; 251/315.07
(58) Field of Classification Search .................. 251/56, 251/160, 161, 162, 163, 188, 192, 315.07, 251/315.08, 315.09; 137/625.47
See application file for complete search history.

(56) References Cited

U.S. PATENT DOCUMENTS

| | | | | |
|---|---|---|---|---|
| 2,200,474 A | * | 5/1940 | Heggem | 251/163 |
| 2,277,975 A | * | 3/1942 | Heggem | 251/163 |
| 3,157,380 A | * | 11/1964 | Sivyer | 251/163 |
| 3,245,653 A | * | 4/1966 | Lavigueur | 251/159 |
| 3,362,433 A | * | 1/1968 | Heinen | 251/163 |
| 3,515,371 A | | 6/1970 | King et al. | |
| 4,141,536 A | * | 2/1979 | Graham | 251/161 |
| 4,231,440 A | * | 11/1980 | Erwin | 251/162 |
| 4,634,098 A | * | 1/1987 | Varden | 251/188 |
| 4,901,763 A | * | 2/1990 | Scott | 251/192 |
| 4,936,547 A | * | 6/1990 | Obst | 251/315.11 |
| 4,940,210 A | * | 7/1990 | Gilmore | 251/160 |
| 5,265,845 A | * | 11/1993 | Gilliam | 251/163 |
| 5,755,427 A | | 5/1998 | Koskinas | |
| 5,988,220 A | * | 11/1999 | Sakaki | 137/625.47 |

* cited by examiner

*Primary Examiner*—John Bastianelli
(74) *Attorney, Agent, or Firm*—Berliner & Associates

(57) ABSTRACT

A ball valve having a reduced sized is provided, that includes a first shaft that extends into a housing accommodating a valve body along a rotational axis of the valve body and is connected to the valve body; and a second shaft that extends into the housing to be oppositely located to the first shaft and is rotatable about an axis line, and has a pressing part that projects radially outwardly from at least a part of the outer circumference of the second shaft. The ball valve is capable of instantly and securely opening and closing communication passages, and changing the direction of fluid flow, while being capable of minimizing the wearing of a seat member for shutting off the communication passages, by having a valve body rotatable while being kept out of contact or substantial contact with the seat member.

6 Claims, 8 Drawing Sheets

PRIOR ART

BALL VALVE WITH A ROTATABLE BODY CAPABLE OF BEING KEPT OUT OF SUBSTANTIAL CONTACT WITH A SEAT MEMBER

CROSS REFERENCE TO RELATED APPLICATION

This application claims priority from Japanese Patent Application No. 2006-277768, which is incorporated herein by reference.

BACKGROUND OF THE INVENTION

1. Field of the Invention

The present invention relates to a ball valve that opens and closes a fluid communication passage or changes the direction of fluid flow by rotating a valve body installed in a housing about a given rotational axis, and more particularly to a ball valve that shuts off a fluid passage formed in a housing by rotating a valve body while keeping it out of contact or substantial contact with an annular seat member disposed on the peripheral edge of an inside open end of the fluid passage, and displacing the valve body towards the seat member while keeping a non-through opening portion of the valve body facing the seat member, thereby bringing the valve body into tight contact with the seal member.

2. Related Art

Hitherto, various types of valves for opening and closing a fluid passage for fluid communication or changing the fluid flow direction have been proposed. Among them, well known is a ball valve that has a ball-shaped valve body and a housing, in which the valve body is rotatable about a given rotational axis and has a communication hole that extends through the valve body along an imaginary surface orthogonal to the rotational axis, and the housing has the valve body installed therein and has at least two communication passages that communicate with each other via the communication hole of the valve body (for a two-way valve, two communication passages, namely an upstream-side communication passage and a downstream-side communication passage are provided, and for a three-way valve, three branched communication passages are provided).

The ball valve of the above type generally has an annular seat member that is to the peripheral edge of an inside open end (an open end located within the housing) of each communication passage in order to ensure the sealing against the valve body during the shut-off of the communication passage, and is structured to have the valve body rotated while being kept in contact (or sliding contact) with the seal member. This type of the ball valve poses a problem in that when the valve body is rotated or slidingly rotated while being kept in contact with the seat member continuously applying a surface pressure, the seat member is worn away and hence the sealing capability may not last for a long period of time.

In order to address the above problem, there is provided a two-way valve (a ball valve), as illustrated in FIG. 8, in which an annular seat member 101 is disposed on the peripheral edge of an inside open end of a communication passage A, one of fluid passages A, B that face each other via a valve body 100, the valve body 100 is rotated while being kept out of contact or kept out of substantial contact with (kept in slight contact with) the seat member 101 and then displaced towards the seat member 101, thereby allowing a non-through opening portion of the valve body 100 to be brought into tight contact with the seat member 101 thereby applying a surface pressure thereto and hence shutting off fluid flow between the fluid passages A, B (cf. Patent Document 1 for example).

The ball valve of the above type allows the non-through opening portion of the valve body 100 to be brought into tight contact with the seat member 101 by continuously rotating a shaft member 102 for rotating the valve body 100, thereby rotating the valve body 100, and then displacing the same towards the seat member 101.

Specifically, the ball valve has a projection 103 formed on a lower portion of the valve body 100 to extend along a given rotational axis L of the valve body 100, and the projection 103 is fitted into a recess 104 formed in a housing 108 so that the valve body 100 is supported in such a manner as to be rotatable about the given rotational axis L. The valve body 100 has a communication hole 106 that is formed by a straight through-hole for communication between the two communication passages A, B, and a communication hole 105 for receiving the shaft member 102, which is formed opposite to the projection 103 to communicate the communication hole 106 with the outside. Two pin members 107, each having an axis substantially parallel to the axis of the communication hole 106, are located inside the through-hole 105 with a given interval therebetween, and a shaft member 102 (or a transmission member 109 later described) is interposed between the pin members 107, 107.

The shaft member 102 extends into the housing 108 and the valve body 100 so as to be movable in the axial direction and rotatable about the axis. Specifically, the shaft member 102 has a first end formed with the transmission member 109 that is inserted between the pin members 107, a second end formed with an outwardly threaded portion 110 that projects outwards from the housing 108, and a guide groove 112 formed on an outer circumference (or a portion extending in the housing 108) of the shaft member 102 closer to the first end than the outwardly threaded portion 110 is, for receiving a guide pin 111.

An inwardly threaded member (or a nut member) that rotates upon receiving driving power from a driving source is threaded onto the outwardly threaded portion 110 of the shaft member 102 so that the shaft member 102 is moved forward and rearward in the axial direction upon driving the inwardly threaded member 113. The guide groove 112 is made up of a rotation guide portion 112a that is twisted in the circumferential direction as it advances from the first end towards the second end, of the shaft member 102, and a straight guide portion 112b that connects with the rotation guide portion 112a and extends straight towards the second end along the axis of the shaft member 102. As described above, the shaft member 102 is moved in the axial direction, so that the guide groove 112 (and hence the shaft member 102) is guided by the guide pin 111, the shaft member 102 is rotated 90° about the axis while being moved in the axial direction, and the non-through opening portion of the valve body 100 is moved straight in the axial direction while being kept facing the seat member 101.

The transmission portion 109 has parallel surfaces formed opposite to each other with the axis therebetween, and is made up of a rotation transmitting part 109a having the parallel surfaces interposed between the two pin members 107, 107 of the valve body 100, and a pressing-force transmitting part 109b having inclined surfaces continuously formed with the parallel surfaces. The transmission portion 109 is so structured that when the shaft member 102 has been rotated 90°, its rotational force is transmitted to the pin members 107 (and hence the valve body 100) via the parallel surfaces of the rotation transmitting part 109a, and as the shaft member 102 is moved forward subsequent to the rotation of the valve body 100, the inclined surfaces of the pressing-force transmitting part 109b are pressed against the pin members 107, thereby pressing the valve body 100 (more specifically the non-through opening portion) against the seat member 101.

Whereby, the ball valve having the above structure is capable of changing the communication passages A, B from an opening state to a closing state by rotating the shaft member 102, thereby rotating the valve body 100 while keeping the same out of contact or substantial contact with the seat member 101, and finally bringing the valve body 100 into tight contact with the seat member 101. The communication passages A, B can be changed from the closing state to the opening state by reversely rotating the shaft member 102, thereby moving the valve body 100 away from the seat member 101, and then rotating the valve body 100 while keeping the same out of contact or substantial contact with the seat member 101.

(Patent Document 1) U.S. Pat. No. 3,515,371

The ball valve having the above structure, which opens and closes the communication passages A, B by moving forward and rearward in the axial direction the shaft member 101 extending in the valve body 100 and the housing 108, poses a problem in that increase of an area, through which the shaft member 101 is moved forward and rearward, results in increase of an installation space of the ball valve.

In addition, the ball valve having the above structure, in which the shaft member 102 is moved forward and rearward by rotating the inwardly threaded member 113 relative to the outwardly threaded portion 110 formed on the shaft member 102, poses a problem in that it takes a time to achieve the axial movement of the shaft member 102, and hence it is difficult to open and close the communication passages in a short time.

As an additional problem associated with the ball valve having the above structure, since the communication passages A, B are opened and closed by drivingly rotating the inwardly threaded member 113, which is threaded onto the shaft member 102, thereby moving the shaft member 102 forward and rearward in the axial direction, it takes a time to open and close the communication passages A, B, as described above, it is very difficult to adjust the opening degree of each of the communication passages A, B, and complicated settings are required for automatic flow-rate control or the like.

In consideration of the above problems, it is an object of the present invention to provide a ball valve having a reduced size, which is capable of easily and instantly opening and closing communication passages, and changing the direction of fluid flow, while being capable of minimizing the wearing of a seat member for shutting off a fluid passage, by having a valve body rotatable while being kept out of contact or substantial contact with the seat member.

SUMMARY OF THE INVENTION

According to the present invention, there is provided a ball valve that includes: a valve body that is rotatable about a given rotational axis and has a communication hole extending through the valve body along an imaginary surface orthogonal or substantially orthogonal to the rotational axis; a housing that accommodates the valve body and has at least two communication passages that each have inside and outside open ends and are communicated with each other through the communication hole; and an annular seat member that is disposed on the peripheral edge of each of at least one of inside open ends of the at least two communication passages. The valve body is rotatable while being kept out of contact or substantial contact with the seat member. The valve body has a non-through opening portion and is movable towards and away from the seat member while the non-through opening portion is kept facing the seat member, so that the non-through opening portion is brought into tight contact with the seat member, thereby shutting off fluid communication between the at least two communication passages. The ball valve further includes: a first shaft that extends into the housing and is connected to the valve body so as to be capable of transmitting rotational force about the rotational axis to the valve body; and a second shaft that extends into the housing to be oppositely located to the first shaft with the valve body therebetween and is rotatable about an axis coaxial or parallel with the first shaft, and has a pressing part that projects radially outwardly from at least a part of the outer circumference of a first end of the second shaft located inside the housing. The valve body has a pressed part that is pressed by the pressing part towards the seat member while the non-through opening portion of the valve body is kept facing the seat member.

By "keeping the valve body out of contact with the seat member" is meant keeping the valve body completely away from the seat member, and by "keeping the valve body out of substantial contact with the seat member" is meant keeping the valve body in slight contact with the seat member or in contact with at least a part of the seat member to such a degree as not to cause surface pressure, which pressure may wear the seat member (such as during a communication passage is shut off). By "movable towards and away from the seat member" is meant that the valve body is moved close to and away from the seat member, and the valve body can be moved from a position at which the valve body is kept in contact with the seat member while applying surface pressure thereto required for completely shutting off fluid communication, to a position at which the valve body is kept out of contact or substantial contact with the seat member, or vice versa.

According to the thus structured ball valve, in which the first shaft extends into the housing passing along the rotational axis of the valve body and is connected to the valve body so as to be capable of transmitting rotational force about the rotational axis to the valve body, it is possible to rotate the valve body about the rotational axis upon the rotation of the first shaft about the axis. Thus, it is possible to change the valve body from a position at which the communication hole of the valve body faces the communication passage formed in the housing and hence permits fluid communication therebetween, to a position at which the non-through opening portion of the valve body faces the communication passage, or vice versa.

The ball valve further includes the second shaft that extends into the housing to be oppositely located to the first shaft with the valve body therebetween and is rotatable about an axis coaxial or parallel with the first shaft, and has the pressing part that projects radially outwardly from at least a part of the outer circumference of a first end of the second shaft located inside the housing, and the valve body has the pressed part that is pressed by the pressing part towards the seat member while the non-through opening portion of the valve body is kept facing the seat member. With this arrangement, the ball valve can be changed from a position, at which the pressing part presses the pressed part, to a position, at which the pressed part is released from the pressing of the pressing part upon rotation of the second shaft about the axis, or vice versa.

Since the valve body is movable towards and away from the seat member while the non-through opening portion is kept facing the seat member, the pressing force acts towards the valve body to move the same towards the seat member, thereby displacing the valve body towards the seat member, upon the pressing of the pressed part by the pressing part. Whereby, the non-through opening portion of the valve body is pressed against the seat member and hence brought into tight contact with the same to shut off the fluid communication between the communication passages.

Meanwhile, when the pressed part is released from the pressing of the pressing part upon the rotation of the second shaft about the axis, the valve body is moved away from the seat member and hence kept out of contact or substantial contact with the seat member. When the first shaft is rotated under this state, it is possible to rotate the valve body while keeping the same out of contact or substantial contact with the seat member, and hence allow the communication hole of the valve body to be kept in communication with the corresponding communication passage of the housing while at the same time minimizing wearing of the seat member. When the valve body is to be changed from the position, at which the communication hole is kept in communication with the corresponding communication passage, to the position, at which fluid flow therebetween is shut off, the opposite procedure is followed. Therefore, in this opposite procedure, too, it is possible to rotate the valve body while being kept out of contact or substantial contact with the seat member, and hence allow the communication hole of the valve body to be kept in communication with the corresponding communication passage of the housing while at the same time minimizing wearing of the seat member.

Thus, according to the ball valve of the present invention, neither the first shaft nor the second shaft is moved forward and rearward in the axial direction, while both are merely rotated. As such, it is possible to reduce the entire size of the ball valve and reduce the space to be occupied for the installation and operation. In addition, since the valve body can be rotated and moved towards and away from the seat member only by the rotation of the first shaft and the second shaft, and thus it is possible to easily and instantly open and close the communication passages A, B and change the direction of fluid flow.

As one form of the present invention, it is preferable that the valve body is connected to the first shaft in such a manner as to be tiltable towards the seat member while the non-through opening portion is kept facing the seat member. With this arrangement, when the pressing part of the second shaft has pressed the pressed part of the valve body, the valve body is tilted relative to the first shaft and hence brought into tight contact with the seat member. Accordingly, the first shaft receives a reaction force that is caused by the tight contact of the valve body to the seat member (a reaction force of the pressing force to the pressed part). Thus, the resulting force acts towards the first shaft and the second shaft, so that the valve body can be more securely kept in tight contact with the seat member.

As a more specific arrangement of the ball valve of the present invention, the at least two communication passages comprise two communication passages formed in the housing with a distance from each other around the rotational axis, and the seat member is disposed on the peripheral edge of the inside open end of each of at least one of the two communication passages. With this arrangement, when the pressing part presses the pressed part by rotating the second shaft while the non-through opening portion of the valve body is kept facing the seat member (any one of the two communication passages with the seat member disposed therein), the non-through opening portion of the valve body is brought into tight contact with the seat member. Thus, fluid flow between the two communication passages can be shut off. Then, when the second shaft is rotated after releasing the pressing of the pressing part to rotate the valve body, it is possible to change the valve body from a position, at which the two communication passages are kept in communication with each other via the communication hole of the valve body (a position permitting fluid flow in the communication passages), to a position, at which the non-through opening portion of the valve body is kept facing the seat member (a position in an operational step before the fluid flow is shut off), or vice versa, while the valve body is kept out of contact or substantial contact with the seat member. Accordingly, the ball valve of the present invention can be used as a two-way valve.

As another form of the ball valve of the present invention, the at least two communication passages comprise three communication passages formed in the housing with a distance from each other about the rotational axis, the communication hole permits fluid communication between a given one of the communication passages and a first one of the residual communication passages (or a first communication passage) adjacent to the given communication passage around the rotational axis, and upon the rotation of the valve body about the rotational axis, the communication hole permits fluid communication between the given communication passage and a second one of the residual communication passages (or a second communication passage) adjacent to the given communication passage around the rotational axis, and the seat member is disposed on the peripheral edge of the inside open end of each of the communication passages other than the given communication passage.

With the above arrangement, the non-through opening portion of the valve body is kept facing the second communication passage while the given communication passage is kept in communication with the first communication passage via the communication hole. Therefore, when the pressing part presses the pressed part under this state upon the rotation of the second shaft, the non-through opening portion of the valve body is brought into tight contact with the seat member disposed on the peripheral edge of the inside open end of the second communication passage adjacent to the given communication passage, and hence fluid communication between the given communication passage and the second communication passage is shut off while fluid communication between the given communication passage and the first communication passage via the communication hole is permitted.

On the other hand, when the valve body is released from the pressing of the pressing part upon the rotation of the second shaft, the valve body is kept out of contact or substantial contact with the seat member. When the valve body is rotated via the first shaft under this state, the non-through opening portion of the valve body is kept facing the first communication passage while the given communication passage is kept in communication with the second communication passage via the communication hole. Accordingly, under this state, too, when the pressing part presses the pressed part upon the rotation of the second shaft, the non-through opening portion of the valve body is brought into tight contact with the seat member disposed on the peripheral edge of the inside open end of the first communication passage, thereby shutting off only fluid communication between the given communication passage and the first communication passage, while permitting fluid communication between the given communication passage and the second communication passage via the communication hole. Accordingly, the ball valve of the present invention can be used as a three-way valve.

Thus, according to the ball valve of the present invention, neither the first shaft nor the second shaft is moved forward and rearward in the axial direction, and therefore neither the first shaft nor the second shaft is moved into and out of the communication hole of the valve body for fluid communication. Thus, as mentioned above, when the ball valve of the present invention is used as a three-way valve, which enables constant communication between any two of the communication passages, the original performance of the three-way valve can be satisfactorily achieved without blocking fluid flow within the communication hole.

As described above, the ball valve of the present invention can produce a significant advantage, such as reducing the entire size of the ball valve while minimizing wearing of the seat member, thanks to the structure in which the ball valve is rotatable while being kept out of contact or substantial contact with the seat member for shutting off the communication passage of the valve body, and easily and instantly open and close the communication passage and change the direction of fluid flow.

BRIEF DESCRIPTION OF THE DRAWINGS

The above, and other objects, features and advantages of the present invention will become apparent from the detailed description thereof in conjunction with the accompanying drawings wherein.

FIGS. 1A and 1B are explanatory views of a ball valve (two-way valve) according to a first embodiment of the present invention, in which FIG. 1A is a vertical cross sectional view illustrating two communication passages kept in communication with each other via a communication hole of a valve body, and FIG. 1B is a vertical cross sectional view illustrating one of the communication passages closed.

FIGS. 2A and 2B are explanatory views for explaining the positional relationship between a pressing part and a pressed part, of the ball valve (two-way valve) of the first embodiment, in which FIG. 2A is a cross sectional view of an enlarged portion and FIG. 2B is a plan view of the enlarged portion.

FIG. 3A illustrates a state in which a valve body and a seat member are kept out of contact (or substantial contact) with each other and two communication passages are communicated with each other via a communication hole of the valve body. FIG. 3B is a plan view of a portion illustrating the positional relationship between the pressing part and the pressed part in the state of FIG. 3A. FIG. 3C illustrates a state in which a valve body and a seat member are kept out of contact with each other, and a non-through opening portion of the valve body faces one of communication passages. FIG. 3D is a plan view of a portion illustrating the positional relationship between the pressing part and the pressed part in the state of FIG. 3C. FIG. 3E illustrates a state in which a valve body and a seat member are kept in contact with each other, and one of communication passages is shut off. FIG. 3F is a plan view of a portion illustrating the positional relationship between the pressing part and the pressed part in the state of FIG. 3C.

FIG. 4A is a vertical cross sectional view and FIG. 4B is a lateral cross sectional view.

FIGS. 5A and 5B are explanatory views for explaining the positional relationship between a pressing part and a pressed part, of the ball valve (three-way valve) of the second embodiment, in which FIG. 5A is a cross sectional view of an enlarged portion and FIG. 5B is a plan view of the enlarged portion.

FIG. 6A illustrates a state in which a given communication passage and a first communication passage face a communication hole of a valve body, and a second communication passage adjacent to the given communication passage faces a non-through opening portion of the valve body while being kept out of contact (or substantial contact) with the same. FIG. 6B is a plan view of a portion illustrating the positional relationship between a pressing part and a pressed part in the state of FIG. 6A. FIG. 6C illustrates a state in which the valve body has been tilted from the position of FIG. 6A into tight contact with a seat member. FIG. 6D is a plan view of a portion illustrating the positional relationship between a pressing part and a pressed part in the state of FIG. 6C.

FIG. 7A illustrates a state in which a given communication passage and a second communication passage face a communication hole of a valve body, and a first communication passage adjacent to the given communication passage faces a non-through opening portion of the valve body while being kept out of contact (or substantial contact) with the same. FIG. 7B is a plan view of a portion illustrating the positional relationship between a pressing part and a pressed part in the state of FIG. 7A. FIG. 7C illustrates a state in which the valve body has been tilted from the position of FIG. 7A into tight contact with a seat member. FIG. 7D is a plan view of a portion illustrating the positional relationship between a pressing part and a pressed part in the state of FIG. 7C.

DETAILED DESCRIPTION OF THE PREFERRED EMBODIMENT

Now, the description will be made for a ball valve according to a first embodiment of the present invention with reference to the drawings attached hereto.

Figure 1A:
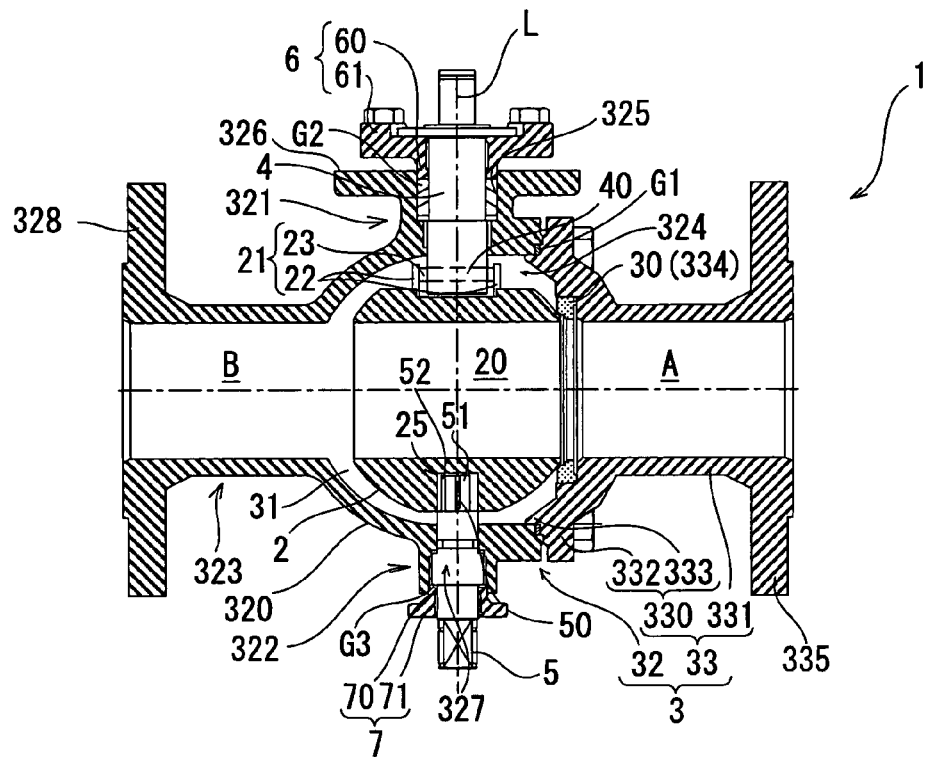
Figure 1B:
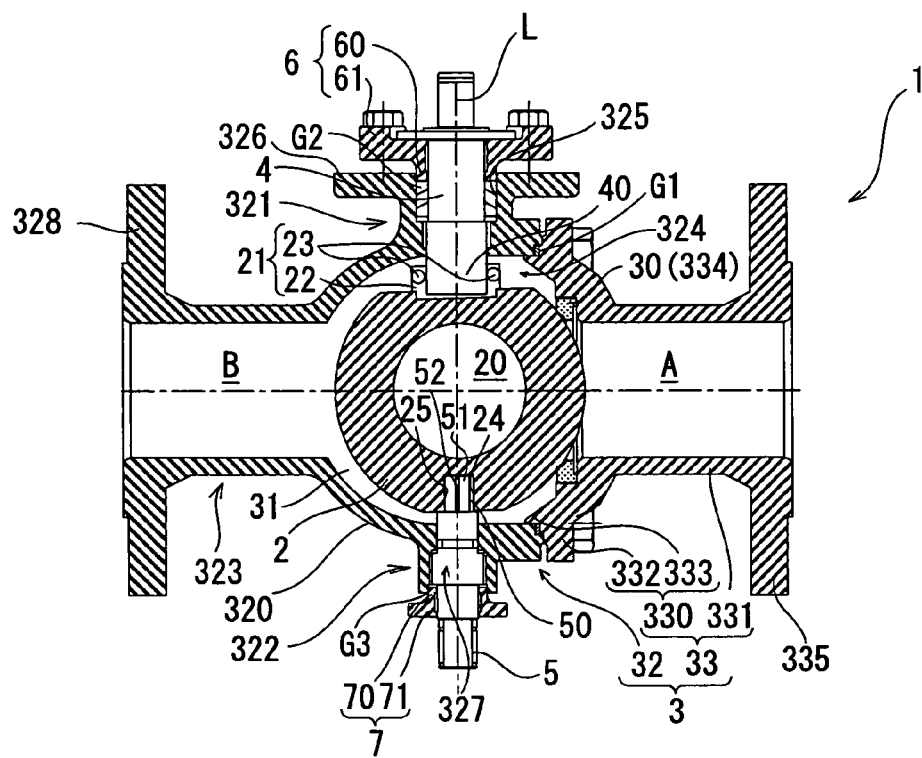

The ball valve of this embodiment is designed to enable connection of two conduits (not illustrated), as illustrated in FIGS. 1A and 1B, and is a two-way valve for selectively permitting and shutting off fluid flow between the two conduits. FIG. 1A is a vertical cross sectional view illustrating two conduits (communication passages A, B later described) kept in communication with each other, and FIG. 1B is a vertical cross sectional view illustrating two conduits (communication passages A, B later described) shut off from each other.

A ball valve 1 of this embodiment is designed to be rotatable about a given rotational axis L, and includes a valve body 2 that has a communication hole 20 extending through the valve body 2 along an imaginary surface orthogonal or substantially orthogonal to the rotational axis L, a housing 3 that has the valve body 2 installed therein, two communication passages A, B formed to be communicated with each other via the communication hole 20 of the valve body 2 and an annular seat member 30 disposed on the peripheral edge of an inside open end of the communication passage A, a first shaft 4 that extends into the housing 3 along the rotational axis L and connected to the valve body 2 to be able to transmit rotational force about the rotational axis L to the valve body 2, and a second shaft 5 that extends into the housing 3 to be oppositely located to the first shaft 4 and designed to be rotatable about an axis coaxial or parallel with the first shaft 4.

The valve body 2 of this embodiment is formed into a substantially spherical shape likewise a conventional ball valve, and the communication hole 20 is formed as a straight hole passing through a substantial center of the valve body 2. The valve body 2 has a non-through opening portion (a portion in which no through opening or communication hole is formed) and is connected to the first shaft 4 to be tiltable towards the seat member 30 while the non-through opening portion is kept facing the seat member 30.

Specifically, the valve body 2 has a shaft receiving portion 21 for receiving a first end (a transmission part 40 later described) of the first shaft 4. The shaft receiving portion 21 has a pair of projection parts 22, 22 that project upwards from an upper portion of the valve body 2 to have a space therebetween, through which the rotational axis L of the valve body 2 passes, and two pin members 23, 23 disposed to have a space therebetween, through which the rotational axis L of the valve body 2 passes and each having opposite ends respectively connected to the pair of projection parts 22, 22. The pair of projection parts 22, 22 are each formed into a substantially plate-like shape and disposed to extend in a direction orthogonal to the axis of the communication hole 20 formed in the valve body 2. The two pin members 23, 23 are disposed to each have an axis parallel or substantial parallel to the axis of the communication hole 20 of the valve body 2. In other words, the two pin members 23, 23 are disposed to extend in a direction substantially orthogonal to the rotational axis L of the valve body 2.

The thus arranged shaft receiving portion 21 receives the transmission part 40 of the first shaft 4 between the two pin members 23, 23, and allows the first shaft 4 (transmission part 40) to contact the pin members 23, 23 to transmit rotational force about the rotational axis L effected by rotating the first shaft 4, thereby rotating the valve body 2. Since the shaft receiving portion 21 of this embodiment is designed to receive the rotational force of the first shaft 4 through the two pin members 23, 23 parallel to the axis of the communication hole 20, the valve body 2 can be tilted with one of the pin members 23, 23 acting as a supporting point, while the non-through opening portion of the valve body 2 is kept facing the communication passage A with the seat member 30 disposed on the peripheral edge of its inside open end.

Figure 2A:
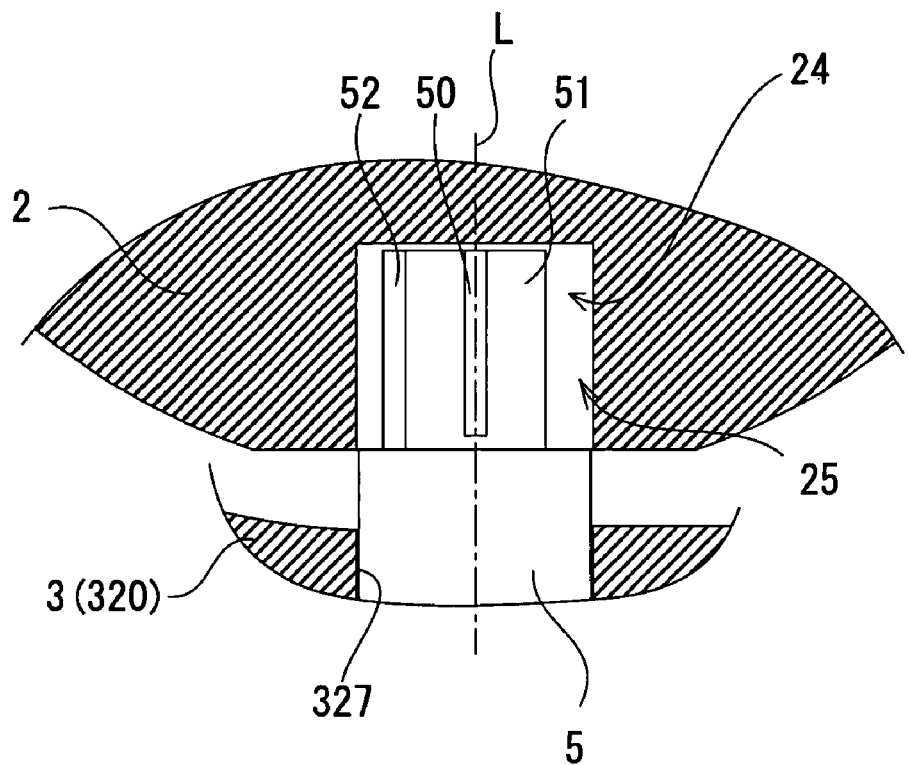
Figure 2B:
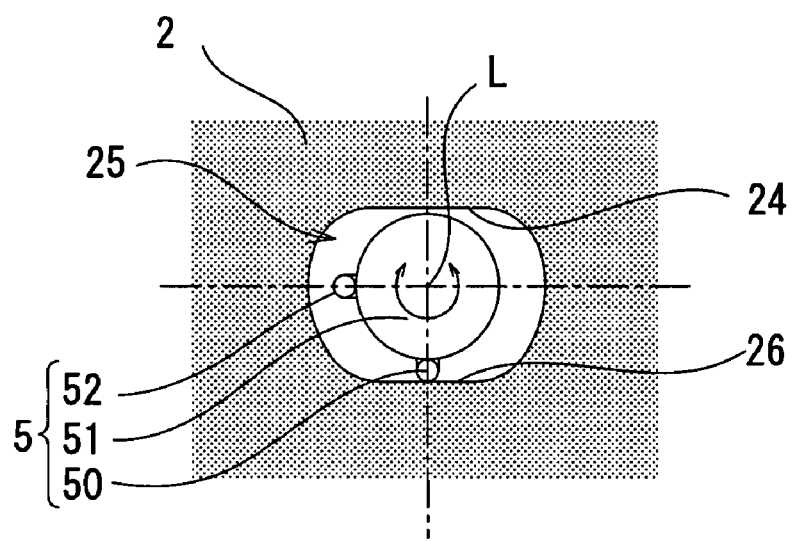

As illustrated in FIGS. 2A and 2B, the valve body 2 of this embodiment has a pressed part 24 disposed on an opposite side to the shaft receiving portion 21 (on a lower portion of the valve body 2) to be pressed by a later-described pressing part (first pressing part) 50 that projects radially outwardly from a first end of the second shaft 5. The pressed part 24 is provided to apply pressing force of the first pressing part 50 to the seat member 30 while the non-through opening portion of the valve body 2 is kept facing the seat member 30. In other words, since the first pressing part 50 of the second shaft 5 radially outwardly projects, the pressed part 24 is formed to allow the first pressing part 50 to abut and press the pressed part 24 by the rotation of the second shaft 5, causing pressing force to be applied in such a direction as to tilt the valve body 2.

The ball valve 1 of this embodiment has a bottomed recess 25 for receiving a first end portion (including the pressing part 50) of the second shaft 5 on a lower portion of the valve body 2, and an inner circumference (defining an open recess) of the recess 25 is formed into a given shape to have a part of the inner circumference of the recess 25 acting as the pressed part 24. Specifically, the recess 25 of the valve body 2 is defined by an inner circumference having the pressed part 24 extending substantially in the same direction as the axis of the communication hole 20, and the pressed part 24 (inner surface) is oriented in a direction orthogonal to the direction in which the valve body 2 can be displaced or tilted with the non-through opening portion of the valve body 2 kept facing the communication passage A (with the axis of the communication hole 20 being orthogonal to the center line of the communication passage A), so that the pressing force of the pressing part 50 can act in a direction to displace the valve body 2.

In this embodiment, the valve body 2 is to be forcibly displaced from the position at which the valve body 2 has been displaced towards the seat member 30 (or at which the valve body is kept in tight contact with the seat member 30) to the opposite side by the pressing force of the pressing part 50 or forcibly displaced away from the seat member 30. In order to achieve this, the inner circumference defining the recess 25 of the valve body 2 has another pressed part (hereinafter referred to a second pressed part) 26 formed by a flat surface extending substantially parallel to and located opposite to the pressed part (hereinafter referred to a first pressed part) 24.

Referring back to FIGS. 1A and 1B, the housing 3 defines a valve-body accommodation space 31 in which the valve body 2 is installed, and the two communication passages A, B are formed to face each other with the valve-body accommodation space 31 therebetween. Specifically, as described above, since the communication hole 20 of the valve body 2 is formed as a straight hole, the two communication passages A, B are formed coaxial with each other to allow the inside openings of the communication passages A, B to face the opposite open ends of the communication hole 20.

The housing 3 of this embodiment is made up of a main frame 32 and a sub-frame 33 attached to the main frame 32, and defines the valve-body accommodation space 31 therein with the sub-frame 33 attached to the main frame 32.

More specifically, the main frame 32 is made up of a body portion 320 defining a part of the valve-body accommodation space 31 for accommodating the valve body 2, a first-shaft insertion portion 321 for receiving the first shaft 4, a second-shaft insertion portion 322 for receiving the second shaft 5, and a conduit connection portion 323 having a tubular shape defining the communication passage B.

The body portion 320 has an inner space that is formed into a substantially hemi-spherical shape, enabling the valve body 2 to be non-contactingly installed. Specifically, the body portion 320 has a circular truncated cone shaped recess to form an opening (hereinafter referred to a fitting port 324) through which the valve body 2 is placed to one side of the body portion 320 and the sub-frame 33 is attached. The fitting port 324 is formed into a substantially rounded shape centering around a center line passing through a substantial center of the valve-body accommodation chamber 31 and oriented orthogonal to the rotational axis L of the valve body 2, and has an open end formed with a stepped portion (no reference numeral is assigned) into which an annular gasket G1 is fitted.

The first-shaft insertion portion 321 is continuously formed with the body portion 320 and has a first-shaft insertion through-hole 325 substantially coaxial with the rotational axis L of the valve body 2. Specifically, the first-shaft insertion through-hole 325 is bored in the first-shaft insertion portion 321 in a direction orthogonal to the center line of the fitting port 324 of the body portion 320 to communicate between the outside and the inside or communicate the recess (valve-body accommodation space 31) of the body portion 320 with the outside.

The first-shaft insertion through-hole 325 is formed by a stepped hole with an outward portion having a large diameter and a portion closer to the valve-body accommodation space 31 having a small diameter. An annular (tubular) gasket G2 is substantially coaxially fitted into the large diameter portion of the hole 325 to ensure the sealing against the inserted first shaft 4.

The gasket G2 of the first-shaft insertion portion 321 of this embodiment is fitted in the first-shaft insertion through-hole 325 and is brought into tight contact with the outer circumference of the first shaft 4 and the inner circumference of the first-shaft insertion through-hole 325 by being pressed in the axial direction of the first shaft 4 in a state where the first shaft 4 has been inserted in the first-shaft insertion through-hole 325, so as to ensure the sealing capability while permitting the rotation of the first shaft 4. Therefore, the ball valve 1 of this embodiment has a gasket pressing member 6 for pressing the gasket G2. The gasket pressing member 6 has a tubular gasket pressing portion 60 that allows the first shaft 4 to extend therethrough and is insertable into the large diameter portion of the first-shaft insertion through-hole 325, and a flange 61 extending outwards from an end of the gasket pressing portion 60. The gasket pressing portion 60 is designed to press the gasket G2 by screwing a bolt (a reference numeral is not allocated), which has been inserted into the flange 61, into the body portion 320.

In this embodiment, since the thus arranged gasket pressing member 6 is employed, the first-shaft insertion portion 321 is provided with a flange portion 326 facing the flange 61 of the gasket pressing member 6 with the gasket pressing portion 60 inserted into the first-shaft insertion through-hole 325. The bolt inserted into the flange 61 is screwed into a threaded hole (not illustrated) formed in the flange portion 326 so that the gasket pressing member 6 can be secured to the body portion 320.

The second-shaft insertion portion 322 is formed continuously with the body portion 320 and located opposite to the first-shaft insertion portion 321 with the body portion 320 therebetween. The second-shaft insertion portion 322 has a second-shaft insertion through-hole 327 substantially coaxial with the rotational axis L of the valve body 2. Specifically, the second-shaft insertion through-hole 327 is bored in the second-shaft insertion portion 322 in a direction orthogonal to the center line of the fitting port 324 of the body portion 320 and is located substantially opposite to the first-shaft insertion through-hole 325 so as to communicate between the outside and the inside or communicate the recess (valve-body accommodation space 31) of the body portion 320 with the outside.

The second-shaft insertion through-hole 327 is formed by a stepped hole with an outward portion having a large diameter and a portion closer to the valve-body accommodation space 31 having a small diameter. An annular (tubular) gasket G3 is substantially coaxially fitted into the large diameter portion of the hole 327 to ensure the sealing against the inserted second shaft 5.

The gasket G3 of the second-shaft insertion portion 322 of this embodiment is fitted in the second-shaft insertion through-hole 327 and is brought into tight contact with the outer circumference of the second shaft 5 and the inner circumference of the second-shaft insertion through-hole 327 by being pressed in the axial direction of the second shaft 5 in a state where the second shaft 5 has been inserted in the second-shaft receiving portion 327, so as to ensure the sealing capability while permitting the rotation of the second shaft 5. Therefore, the ball valve 1 of this embodiment has a gasket pressing member 7 for pressing the gasket G3 in the second-shaft insertion portion 322, in the same manner as the first-shaft insertion portion 321.

The gasket pressing member 7 has a tubular gasket pressing portion 70 that allows the second shaft 5 to extend therethrough and is insertable into the large diameter portion of the second-shaft insertion through-hole 327, and a flange 71 extending outwards from an end of the gasket pressing portion 70. The gasket pressing member 7 is designed to press the gasket G3 by screwing a bolt (not illustrated) inserted into the flange 71 into the body portion 320.

In this embodiment, since the gasket pressing member 7 is employed in the same manner as the first-shaft insertion portion 321, the second-shaft insertion portion 322 is formed with an annular (donut-like) flat portion facing the flange 71 of the gasket pressing member 7 with the gasket pressing portion 70 inserted into the second-shaft insertion through-hole 327. The bolt inserted into the flange 71 is screwed into a threaded hole (not illustrated) formed in the flat portion so that the gasket pressing member 7 can be secured to the body portion 320.

The conduit connection portion 323 of the main frame 32 has one end side connected to the body portion 320 so that the communication passage B formed therein is communicated with a recessed portion of the body portion 320 and the center line of the communication passage B is oriented orthogonal to the rotational axis L of the valve body 2. Specifically, the conduit connection portion 323 is continuously formed with the body portion 320 so that the communication passage B is oriented substantially orthogonal to the axis of the first shaft 4 and substantially coaxial with the center of a recessed portion (the fitting port 324) of the body portion 320. The conduit connection portion 323 is provided with a flange 328 for connecting a conduit to an opposite end side of the conduit connection portion 323.

The sub-frame 33, which is attached to the main frame 32, has a sealing portion 330 for sealing the fitting port 324 of the body portion 320, and a tubular conduit connection portion 331 defining therein the communication passage A.

The sealing portion 330 has an annular part 332 that faces the peripheral edge of an outside open end of the fitting port 324 of the body portion 320 and abuts the gasket G1, and an annular projection 333 to be fitted in the fitting port 324. The annular part 332 defines an opening as an extension of the communication passage A defined by the conduit connection portion 331, and holes (not illustrated), through which bolts are inserted, are bored in an area of the annular part 332, which area facing the peripheral edge of the open end of the body portion 320. Whereby, the annular part 332 is brought into tight contact with the gasket G1 of the body portion 320 (the peripheral edge of the open end of the fitting port 324) by screwing inserted screws into threaded holes (not illustrated) formed in an outer circumference of the fitting port 324, so that the sealing effect between the sub-frame 33 and the main frame 32 (body portion 320) can be ensured.

The annular projection 333 is designed to be guided along the inner circumference of the body portion 320 while being kept fit in the fitting port 324, so that the sub-frame 33 (substantially the seat member 30 and the communication passage A) can be positioned relative to the main frame 32.

The peripheral edge of an open end of the annular part 332, which is located close to the recess (fitting port 324) of the body portion 320, is formed with an annular stepped portion 334, into which the annular seat member 30 is fitted. With this arrangement, the seat member 30 is disposed on the peripheral edge of an open end of the communication passage A, which open end being located inside of the housing 3 when the sub-frame 33 has been attached to the main frame 32. The conduit connection portion 331 of the sub-frame 33 has one end side connected to the peripheral edge of an opposite open end of the annular part 332. Thus, with the sealing portion 330 attached to the body portion 320, the communication passage A faces the communication passage B and the center line of the communication passages A, B is oriented orthogonal to the rotational axis L of the installed valve body 2. The opposite end of the conduit connection portion 331 is also formed with a flange 335 for connection with a conduit.

Thus, the housing 3 defines the valve-body accommodation space 31 for accommodating therein the valve body 2 by attaching the sub-frame 33 to the main frame 32.

As described above, the first shaft 4 is inserted into the housing 3 (the first-shaft insertion portion 321), and has an end located within the housing 3 and formed with the transmission part 40 that is inserted between the pin members 23, 23 of the valve body 2, thereby transmitting rotational fore about the rotational axis L to the valve body 2 via the pin members 23, 23.

Specifically, the transmission part 40 has on an outer circumference thereof two flat surfaces extending substantially parallel to each other and located opposite to each other with the axis therebetween. The two flat surfaces are formed with a distance therebetween, which distance being substantially equal to or slightly smaller than the distance between the pin members 23, 23. The transmission part 40 is inserted between the pin members 23, 23 so as to have the two flat surfaces respectively facing the corresponding pin members 23, 23, thereby enabling transmission of the rotational force about the rotational axis L, and hence enabling the valve body 2 to be tilted towards and away from the seat member 30 around a contacting portion of one of the pin members 23, 23 and the corresponding flat surface while the non-through opening portion of the valve body 2 is kept facing the seat member 30 (the first communication passage A).

Although the first shaft 4 may be manually rotated by attaching a handle or the like thereto, a driving motor (not illustrated) such as a pulse motor, which can optionally set the rotational angle of the first shaft 4, is connected to the opposite side of the first shaft 4 in this embodiment, so that the first shaft 4 can be rotated about the axis (or the rotational axis L of the valve body 2) by the driving force of the driving motor.

The second shaft 5 is inserted into the housing 3 (or more specifically the second-shaft insertion portion 322), and has one end located within the housing 3 and formed with the pressing part 50 that projects radially outwardly from at least a portion of the outer circumference of the second shaft 5. Although the second shaft 5 may be manually rotated by attaching a handle or the like thereto in the same manner as the first shaft 4, a driving motor (not illustrated) such as a pulse motor, which can optionally set the rotational angle of the second shaft 5, is connected to the opposite end side of the second shaft 5 in this embodiment.

Describing more specifically the second shaft 5, the second shaft 5 is made up of a shaft body 51 extending in the housing 3, and the pressing part 50 projecting from a part of the outer circumference of the shaft body 51, as illustrated in FIGS. 2A and 2B. The pressing part 50 projects from the outer circumference of the shaft body 51, and therefore is different in rotation radius from the shaft body 51. Thus, when the second shaft 5 is rotated about the rotational axis L, the pressing part 50 contacts and then presses the pressed part 24 of the valve body 2.

In addition to the aforesaid pressing part (hereinafter referred to a first pressing part) 50, the second shaft 5 of this embodiment has another pressing part (hereinafter referred to a second pressing part) 52 that projects radially outward from a part of the outer circumference of the shaft body 51. Specifically, the second shaft 5 has the first pressing part 50 that presses the pressed part 24 of the valve body 2 to press the valve body 2 towards the seat member 30, thereby forcibly pressing the valve body 2 to the seat member 30, and the second pressing part 52 that presses the valve body 2, which has been displaced towards the seat member 30 by the pressure of the first pressing part 50, in such a direction as to move the same away from the seat member 30, thereby forcibly moving the valve body 2 away from the seat member 30.

The first pressing part 50 and the second pressing part 52 of this embodiment each are formed by a rod member joined to the shaft body 51 to have an axis extending substantially parallel to the axis of the shaft body 51. The first pressing part 50 and the second pressing part 52 are disposed at an angular distance of less than 180° relative to each other around the shaft body 51 (FIG. 2 illustrates an arrangement with an angular distance of about 90°), so that only one of the pressing parts 50, 52 contacts or presses the pressed part 24 or the second pressed part 26. More specifically, with the communication hole 20 of the valve body 2 keeping the two communication passages A, B in communication with each other, the first pressing part 50 does not press the first pressed part 24 but is brought into substantial contact with the second pressed part 26 (cf. FIG. 3B). From this position, only the valve body 2 is rotated 90° via the first shaft 4, so that the second pressing part 52 abuts the second pressed part 26, thereby stopping the tilting of the valve body 2 towards the seat member 30 (cf. FIG. 3D).

Thus, when the first pressing part 50 is not pressing the first pressed part 24, the center line of the communication hole 20 of the valve body 2 passes the crossing point of the center line of the coaxially arranged two communication passages A, B and the rotational axis L of the valve body 2, thereby keeping the valve body 2 out of contact or substantial contact with the seat member 30. On the other hand, when the first pressing part 50 is pressing the first pressed part 24, the valve body 2 is tilted, thereby having the center line of the communication hole 20 displaced from the crossing point. By "keeping the valve body 2 out of contact with the seat member 30" is meant keeping the valve body 2 completely away from the seat member 30, and by "keeping the valve body 2 out of substantial contact with the seat member 30" is meant keeping the valve body 2 in slight contact with the seat member 30 or in contact with at least a part of the seat member 30 to such a degree as not to cause surface pressure, which may wear the seat member 30 (such as during the communication passages are shut off).

Now, the description will be made for an operation of the thus structured ball valve 1 of this embodiment.

Figure 3A:
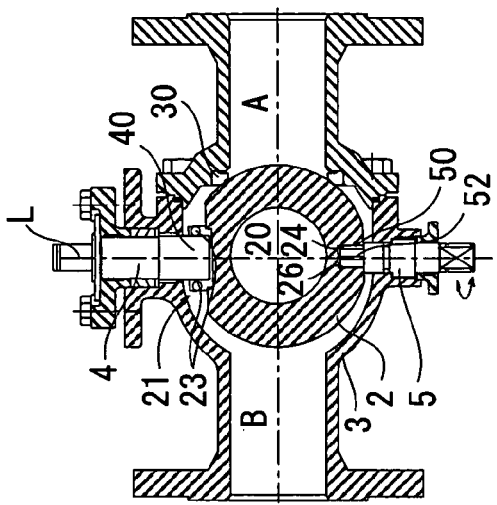
FIGS. 3A to 3F are explanatory views for an operation of the ball valve (two-way valve) of the first embodiment. Specifically.
Figure 3B:
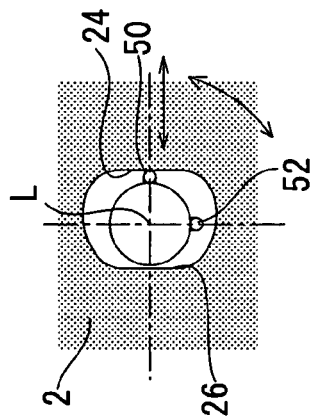

As illustrated in FIG. 3A, upon the communication of the two communication passages A, B via the communication hole 20 of the valve body 2, fluid flow is permitted. At this position, the two communication passages A, B are arranged coaxial or substantially coaxial with the communication hole 20 of the valve body 2, the valve body 2 is kept out of contact or substantial contact with the seat member 30, and, as illustrated in FIG. 3B, neither the first pressing part 50 nor the second pressing part 52 is not pressing the first pressed part 24 and the second pressed part 26, of the valve body 2.

Figure 3C:
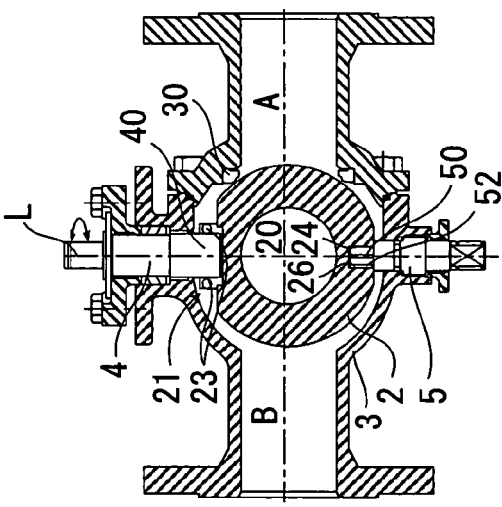

For shutting off the communication passages A, B which are kept at the above position, at which fluid flow is permitted, only the first shaft 4 is rotated 90° while keeping the position of the second shaft 5, as illustrated in FIG. 3C. Accordingly, the rotational force of the first shaft 4 is transmitted to the valve body 2 via the transmission part 40 and the shaft receiving portion 21, and hence the valve body 2 is also rotated 90°. When the valve body 2 is thus rotated without rotation of the second shaft 5, the first pressed part 24 and the second pressed part 26 are also rotated along with the rotation of the valve body 2, and hence the second pressing part 52 abuts the second pressed part 26 while the first pressed part 24 is positioned close to the shaft body 51 of the second shaft 5, as illustrated in FIG. 3D.

Thus, even if the valve body 2 is rotated, the first pressed part 24 is not pressed by the first pressing part 50, so that the valve body 2 is kept out of contact or substantial contact with the seat member 30. As a result, the non-through opening portion of the valve body 2 faces the communication passage A (seat member 30) with a clearance therebetween or in slight contact thereto.

Figure 3D:
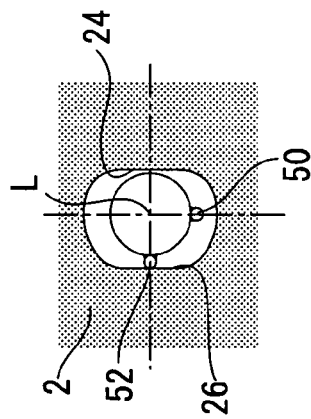
Figure 3E:
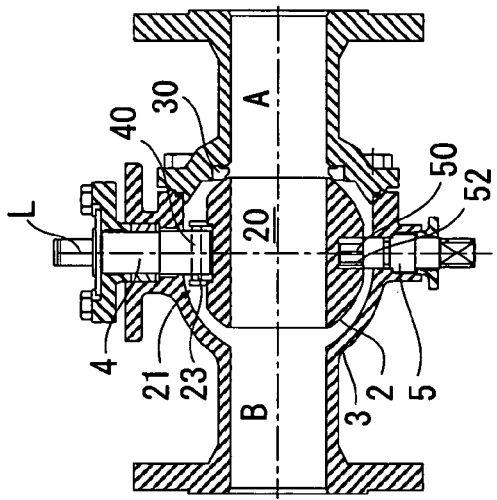
Figure 3F:
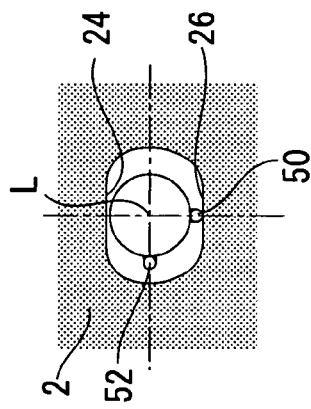

As illustrated in FIGS. 3E and 3F, when the second shaft 5 has been rotated (90° in this embodiment), the second pressed part 26 is released from abutting engagement with the second pressing part 52, while the first pressing part 50 presses the first pressed part 24. Thus, the valve body 2 is tilted towards the seat member 30 by the pressing effect of the first pressing part 50 to the pressed part 24. As a result, the non-through opening portion of the valve body 2 is brought into tight or press contact with the seat member 30 while applying surface pressure thereto, while the communication passage A (or between the two communication passages A, B) is shut off, thereby stopping fluid flow.

When the valve is to be changed from the above position to a position permitting fluid flow, the second shaft 5 is reversely rotated (rotated (−90°) in a direction opposite to the direction in which the valve body 2 is displaced towards the seat member 30), the pressed part 24 is released from abutting engagement with the first pressing part 50, while the second pressing part 52 presses the second pressed part 26, as illustrated in FIG. 3D. Thus, the valve body 2 is tilted away from the seat member 30 by the pressing effect of the second pressing part 52 to the second pressed part 26. As a result, the valve body 2 is returned to a position at which it is kept out of contact or substantial contact with the seat member 30, as illustrated in FIG. 3C. Then, the first shaft 4 is reversely rotated (rotated (−90°) in a direction opposite to the direction in which the non-through opening portion of the valve body 2 is brought into a position at which it faces the seat member 30) without rotation of the second shaft 5, the two communication passages A, B are returned to a state in which they permit fluid flow via the communication hole 20 of the valve body 2, as illustrated in FIG. 3A.

As described above, the ball valve 1 of this embodiment has the first and second shafts 4, 5 that are not moved forward and backward in the axial direction, but merely rotated, which structure contributes to the reduction of the entire size of the ball valve 1 and reduction in space to be occupied for the installation and operation. Since the rotation of the valve body 2 and the movement of the valve body 2 towards and away from the seat member 30 can be achieved only by the rotation of the first shaft 4 and the second shaft 5, it is possible to easily and instantly open and close the communication passages A, B, adjust the flow rate, and the like.

Since the valve body 2 is connected to the first shaft 4 in such a manner as to be tiltable towards the seat member 30 while the non-through opening portion is kept facing the seat member 30, the valve body 2 is tilted towards the first shaft 4 and hence brought into tight contact with the seat member 30 when the first pressing part 50 of the second shaft 5 has pressed the first pressed part 24 of the valve body 2. In addition, a reaction force caused by this tight contact (a reaction force resulting from the pressing force by pressing of the first pressing part 50) is received by the first shaft 4. Whereby, a force acts towards both the first shaft 4 and the second shaft 5 so that the valve body 2 more tightly contacts the seat member 30. Thus, high sealing performance can be achieved.

In the ball valve 1 of this embodiment, the second pressing part 52 and the second pressed part 26 are provided to change the valve body 2 from the position at which it is kept in tight contact with the seat member 30 to the position at which it is kept away from the seat member 30. Therefore, the valve body 2 can be rotated while being kept out of contact or substantial contact with the seat member 30. Thus, it is possible to more securely minimize wearing of the seat member 30.

Now, the description will be made for a ball valve of a second embodiment of the present invention, in which the identical or corresponding structures, parts or members to those of the first embodiment are allocated the same name and the same reference numerals with dash (').

Figure 4A:
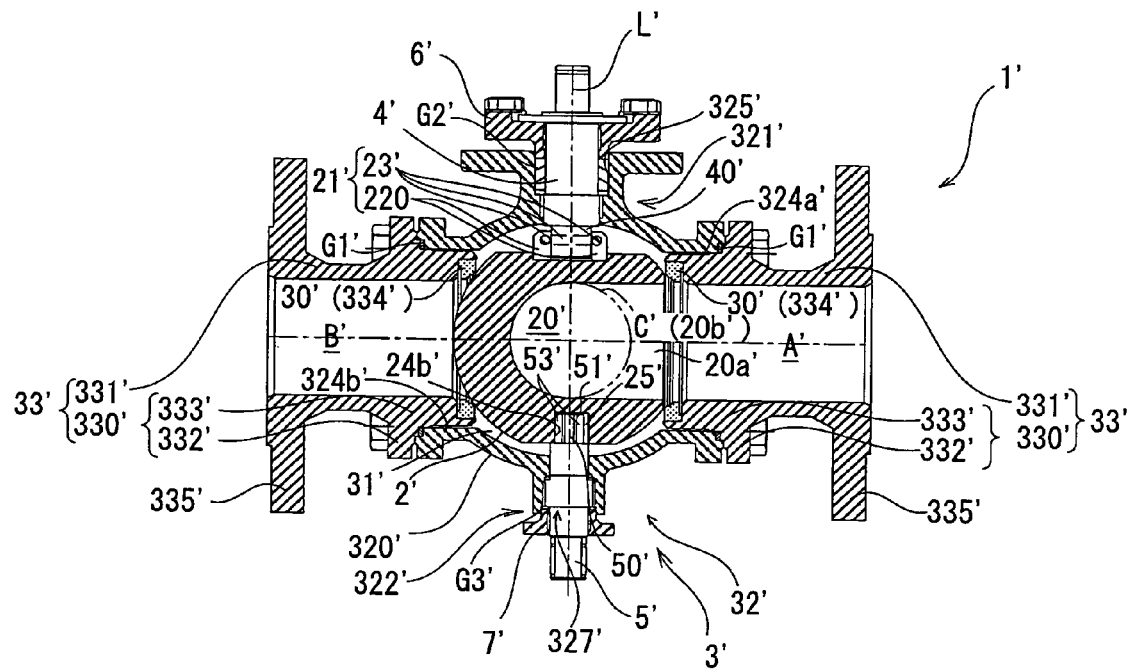
FIGS. 4A and 4B are cross sectional views of a ball valve (three-way valve) according to a second embodiment of the present invention. Specifically.
Figure 4B:
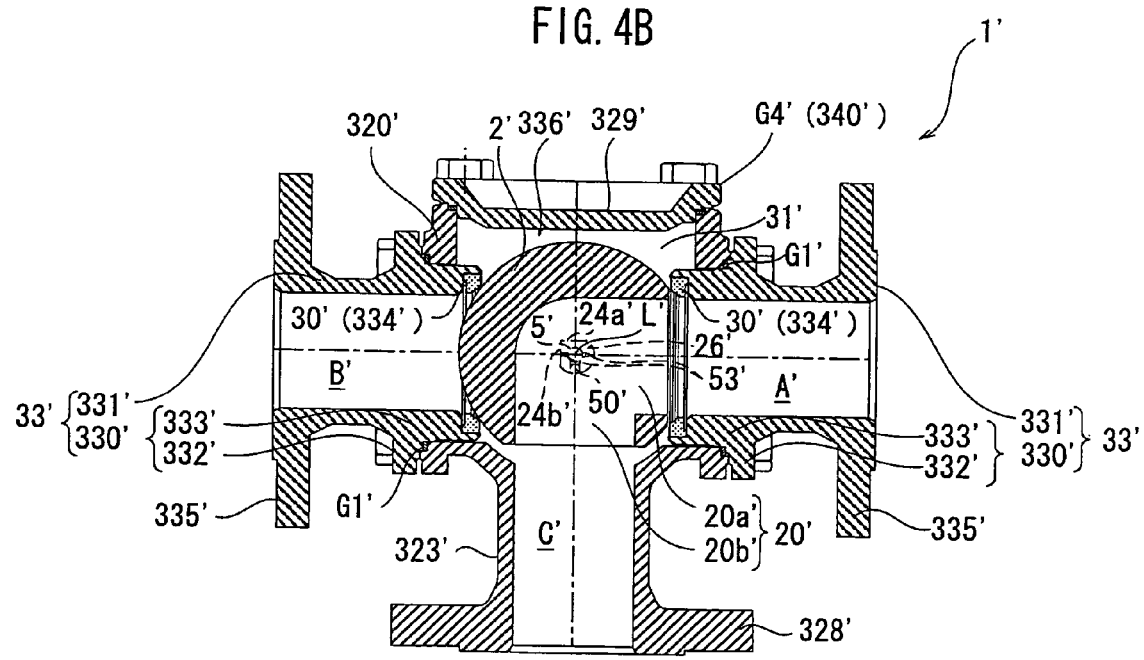

As illustrated in FIGS. 4A and 4B, the ball valve of this embodiment is a three-way valve that is designed to be connected to three conduits (not illustrated) and change the fluid communication passages to bring either two of three these conduits into communication with each other. FIG. 4A is a vertical cross section illustrating two conduits (communication passages A', C' later described), which are kept in communication with each other, and FIG. 4B is a lateral cross sectional view illustrating two conduits (communication passages A', C' later described), which are kept in communication with each other.

A ball valve 1' of this embodiment is designed to be rotatable about a given rotational axis L', and includes a valve body 2' that has a communication hole 20' extending through the valve body 2' along an imaginary surface orthogonal or substantially orthogonal to the rotational axis L', a housing 3' that has the valve body 2' installed therein, three communication passages A', B', C' formed around the rotational axis L' with a distance from each other, annular seat members 30', 30' disposed on the peripheral edges of the inside open ends of any two of the communication passages A', B', C' (communication passages A', B' in this embodiment, hereinafter referred to a first communication passage A' and a second communication passage B', respectively) located adjacent to each other around the rotational axis L' of the valve body 2' with any one of the communication passages or a given communication passage (a communication passage C' in this embodiment) therebetween, a first shaft 4' that extends into the housing 3' along the rotational axis L' and connected to the valve body 2' to be able to transmit rotational force about the rotational axis L' to the valve body 2', and a second shaft 5' that extends into the housing 3' to be oppositely located to the first shaft 4' and designed to be rotatable about an axis coaxial or parallel with the first shaft 4'.

The valve body 2' of this embodiment is formed into a substantially spherical shape. The communication hole 20' is bent or curved (curved in FIG. 4B), as viewed in plan, so as to be able to change between a position enabling communication of the given communication passage C' to the first communication passage A' located adjacent to the communication passage C' around the rotational axis L', and a position enabling communication of the given communication passage C' to the second communication passage B' located adjacent to the communication passage C' around the rotational axis L', by the rotation of the valve body 2' about the rotational axis L'. In this embodiment, the communication hole 20' is formed into an L-shape as viewed in plan on an imaginary surface (to be bent at a substantially right angle). In the same manner as the first embodiment, the valve body 2' is connected to the first shaft 4' to be tiltable towards the seat members 30', 30' while the non-through opening portion is kept facing the seat members 30', 30'.

More specifically, the valve body 2' is provided with a shaft receiving portion 21' for receiving a first end of the first shaft 4' (a transmission part 40' later described). The shaft receiving portion 21' of this embodiment has four support projections 220, . . . that are disposed in a matrix-like arrangement and project upwards from an upper portion of the valve body 2', and four pin members 23', . . . that respectively have ends connected to the four support projections 220, . . . and disposed in a frame-like arrangement as viewed in plan. Among the four pin members 23', . . . , a pair of the pin members 23', 23', facing each other are disposed parallel to or substantially parallel to the axis of one of straight portions (holes) of the L-shaped communication hole 20', and the residual pair of the pin members 23', 23' are disposed parallel to or substantially parallel to the axis of another straight (hole) portion of the L-shaped communication hole 20'.

The thus arranged shaft receiving portion 21' receives the transmission part 40' of the first shaft 4' in an area surrounded by the four pin members 23', . . . , and allows the first shaft 4' (transmission part 40') to contact the pin members 23', 23' to transmit rotational force about the rotational axis L' effected by rotating the first shaft 4', thereby rotating the valve body 2'. Since the shaft receiving portion 21' of this embodiment is designed to receive the rotational force of the first shaft 4' through the four pin members 23', . . . disposed parallel to the axis of the communication hole 20', the given communication passage C' is communicated to the first communication passage A' adjacent thereto via the communication passage 20', and under this state, the valve body 2' can also be tilted about the pin member 23' that is disposed substantially parallel to the axis of a straight portion 20b' of the communication hole 20' that is kept in fluid communication with the given communication passage C' while the non-through opening portion of the valve body 2' is kept facing the second communication passage B' having the seat members 30', 30' disposed on the peripheral edge of the open ends thereof.

Figure 5A:
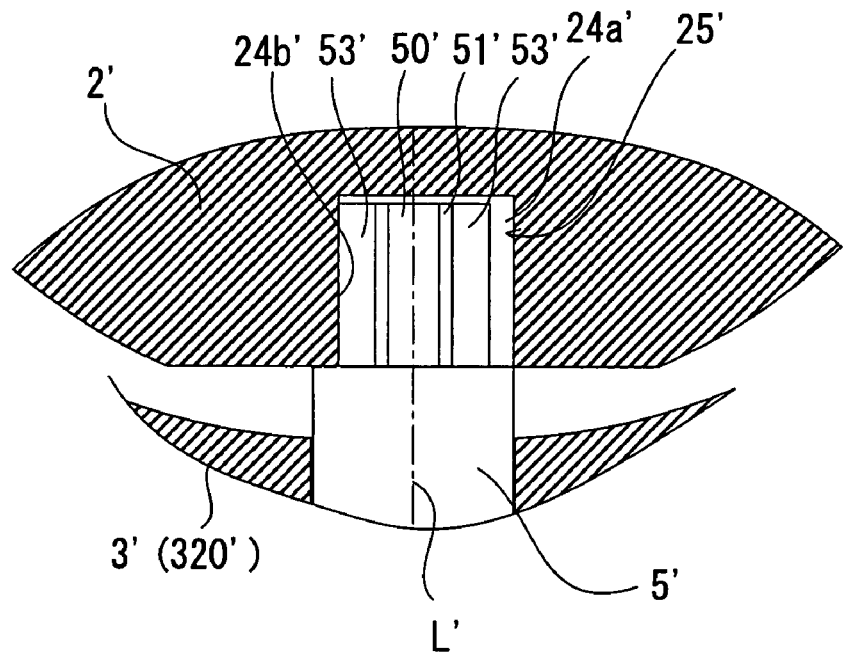
Figure 5B:
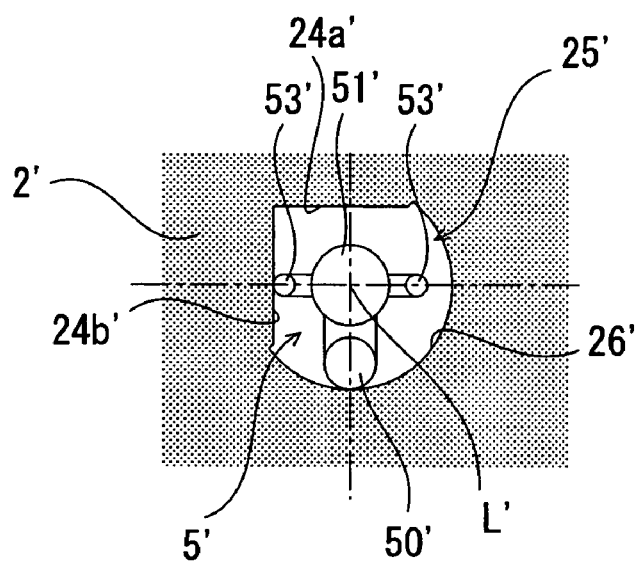

As illustrated in FIGS. 5A and 5B, the valve body 2' of this embodiment has pressed parts 24a', 24b' disposed opposite to the shaft receiving portion 21' to be pressed by a later-described pressing part 50' that projects radially outwardly from a first end of the second shaft 5'. The pressed parts 24a', 24b' are provided to apply pressing force of the pressing part 50' to the seat members 30', 30' while the non-through opening portion of the valve body 2' is kept facing the seat members 30', 30'. In other words, since the pressing part 50' of the second shaft 5' radially outwardly projects, the pressed parts 24a', 24b' are formed to allow the pressing part 50' to abut and press the pressed parts 24', 24b' by the rotation of the second shaft 5', causing the pressing force to act in such a direction as to tilt the valve body 2'.

The ball valve 1' of this embodiment has a bottomed recess 25' for receiving a first end portion (including the pressing part 50') of the second shaft 5' in the lower portion of the valve body 2', and an inner circumference (defining an open recess) is formed into a given shape to have parts of the inner circumference of the recess 25' acting as the pressed part 24a', 24b'. Specifically, the recess 25' of the valve body 2' is defined by an inner circumference having the two pressed parts 24a', 24b' respectively extending substantially in the same directions as the axes of the straight portions 20a', 20b' of the communication hole 20' respectively extending from the bent portion.

In this embodiment, since the communication hole 20' is bent at an angle of about 90°, the two pressed parts 24', 24b' are arranged at a right angle relative to each other, as viewed in plan, to be in conformity with the communication hole 20', so that while the non-through opening portion of the valve body 2' is kept facing the first communication passage A' adjacent to the given communication passage C' (or while the axis of the communication hole 20' (the first straight portion 20a') is kept orthogonal to the center line of the first communication passage A'), the pressed part 24a' (inner surface) is oriented orthogonal to the direction in which the displacement (tilting) of the valve body 2' is permitted, and the pressing force of the pressing part 50' acts in a direction enabling the valve body 2' to be displaced towards the seat member 30' facing the non-through opening portion (cf. FIG. 7). On the other hand, while the non-through opening portion of the valve body 2' is kept facing the second communication passage B' adjacent to the given communication passage C' (or while the axis of the communication hole 20' (the second straight portion 20b') is kept orthogonal to the center line of the communication passages A', B'), the pressed part 24b' (inner surface) is oriented orthogonal to the direction in which the displacement (tilting) of the valve body 2' is permitted, and the pressing force of the pressing part 50' acts in a direction enabling the valve body 2' to be displaced towards the seat member 30' facing the non-through opening portion (cf. FIG. 6).

In this embodiment, the valve body 2' is to be forcibly displaced from the position at which the valve body 2' has been displaced towards the seat members 30', 30' (or at which the valve body 2' is kept in tight contact with the seat members 30', 30') to the opposite side by the pressing force of the pressing part 50' or forcibly displaced away from the seat members 30', 30'. In order to achieve this, the inner circumference defining the recess 25' of the valve body 2' has another pressed part (hereinafter referred to a second pressed part) 26' of a circular arc surface having a fan-like shape in its entirety, in addition to the two pressed parts (hereinafter referred to first pressed parts) 24a', 24b'. The second pressed part 26' is curved with a curvature radius corresponding to the rotational radius of the pressing part 50', so that when the pressing part 50' (second shaft 5') has been rotated 180° from the position at which it presses any one of the flat-shaped first pressed parts 24a', 24b', the pressing part 50' presses the second pressed part 26', thereby displacing the valve body 2' to the opposite side. When the pressing part 50' is kept in contact with the second pressed part 26', the valve body 2' is kept away from the seat members 30', 30' and the axis of the communication hole 20' of the valve body 2' passes the crossing point of the rotational axis L' of the valve body 2' and the axes of the communication passages A', B', C'.

Referring back to FIGS. 4A and 4B, the housing 3' defines a valve-body accommodation space 31' in which the valve body 2' is installed, and the three communication passages (holes) A', B', C' are joined together via the valve-body accommodation space 31' to have a T-like shape. Specifically, of the three communication passages A', B', C', the two communication passages A', B' face to each other with the valve-body accommodation space 31' therebetween, and the residual communication passage C' as a given communication passage is connected to the valve-body accommodation space 31' to be oriented at a substantially right angle relative to the two communication passages A', B'.

The housing 3' of this embodiment is made up of a main frame 32' and a pair of sub-frames 33', 33' attached to the main frame 32', and defines the valve-body accommodation space 31' therein with the pair of sub-frames 33', 33' attached to the main frame 32'.

More specifically, the main frame 32' is made up of a body portion 320' defining a part of the valve-body accommodation space 31' for accommodating the valve body 2', a first-shaft insertion portion 321' for receiving the first shaft 4', a second-shaft insertion portion 322' for receiving the second shaft 5', and a conduit connection portion 323' having a tubular shape defining the given communication passage C'.

The body portion 320' has an inner space, in which the valve body 2' is non-contactingly installed, and has an insertion port 328' formed by a substantially rounded opening, through which the valve body 2' is inserted into the space. The insertion port 328' is designed to be sealed by a lid member 329' formed separately from the body portion 320'. Specifically, the insertion port 328' has an inner peripheral edge formed with a stepped portion 340' into which an annular gasket G4' is fitted. The lid member 329' is attached to the body portion 320' by bolts (no reference numerals are assigned) so as to ensure the sealing between the body portion 320' and the lid member 329' by the gasket G4', and the valve-body accommodation space 31' is defined by sealing the space within the body portion 320'.

The body portion 320' of this embodiment has opposite ends formed with openings (hereinafter referred to fitting ports) 324a', 324b' for the attachment of the sub-frames 33', 33' to have the opening centers of the fitting ports 324a', 324b' oriented orthogonal to the center line of the insertion port 328'. The two fitting ports 324a', 324b' are coaxial with each other and each are formed into a substantially rounded shape around the center line orthogonal to the rotational axis L' of the valve body 2' within the valve-body accommodation space 31'. The fitting ports 324a', 324b' have the peripheral edges of the outside open ends formed with stepped portions (no reference numerals are assigned) for fittingly receiving annular gaskets G1'.

The first-shaft insertion portion 321' is formed continuously with the body portion 320', and has a first-shaft insertion through-hole 325' substantially coaxial with the rotational axis L' of the valve body 2'. Specifically, the first-shaft insertion through-hole 325' is bored in the first-shaft insertion portion 321' in a direction orthogonal to the center lines of the fitting ports 324a', 324b' of the body portion 320' to communicate between the outside and the inside or communicate the space (valve-body accommodation space 31') within the body portion 320' with the outside.

The first-shaft insertion through-hole 325' is formed by a stepped hole with an outward portion having a large diameter and a portion closer to the valve-body accommodation space 31' having a small diameter, in the same manner as the first embodiment. An annular (tubular) gasket G2' is substantially coaxially fitted into the large diameter portion of the hole 325' to ensure the sealing against the inserted first shaft 4'. The gasket G2' is fitted in the first-shaft insertion through-hole 325' in the same manner as the first embodiment and is brought into tight contact with the outer circumference of the first shaft 4' and the inner circumference of the first-shaft insertion through-hole 325' by being pressed in the axial direction of the first shaft 4' when the first shaft 4' has been inserted in the first-shaft insertion through-hole 325', so as to ensure the sealing capability while permitting the rotation of the first shaft 4'. Therefore, in this embodiment, too, the gasket G2' is pressed by a gasket pressing member 6' having a similar arrangement to that of the first embodiment to produce the sealing effect.

The second-shaft insertion portion 322' is formed continuously with the body portion 320' and located opposite to the first-shaft insertion portion 321' with the body portion 320' therebetween. The second-shaft insertion portion 322' has a second-shaft insertion through-hole 327' substantially coaxial with the rotational axis L' of the valve body 2'. In the same manner as the first embodiment, a gasket G3' is fitted in the second-shaft insertion through-hole 327' to ensure the sealing capability of the gasket G3' by a gasket pressing member 7' having a similar arrangement to that of the first embodiment. The gasket pressing members 6', 7' are mounted to the first-shaft insertion portion 321' and the second-shaft insertion portion 322' of the body portion 320' in the same manner as the first embodiment.

A conduit connection portion 323' of the main frame 32' is formed continuously with the body portion 320', and the communication passage C' formed therein is communicated with an inner space of the body portion 320'. The conduit connection portion 323' has a first end formed continuously with the body portion 320' so as to allow the center of the given communication passage C' to be coaxial with the opening center of the insertion port 328'. Specifically, the conduit connection portion 323' is formed continuously with the body portion 320' so as to have the communication passage C' oriented substantially orthogonal to the axis of the first shaft 4' and the opening centers of the fitting ports 324a', 324b' of the body portion 320'. The conduit connection portion 323' is provided with a flange 328' for connecting a conduit to an opposite end of the conduit connection portion 323'.

Since the sub-frames 33', 33' to be attached to the main frame 32' have the identical structure, the following description will be made only for one of the sealing portions 330'.

The sub-frame 33" has a sealing portion 330' for sealing the fitting port 324a' or 324b' of the body portion 320' and a tubular conduit-connection portion 331' defining therein the first communication passage A' or the second second communication passage B'.

The sealing portion 330' has an annular part 332' that faces the peripheral edge of an outside open end of the fitting port 324a' or 324b' of the body portion 320' and abuts the gasket G1', and an annular fitting part 333' (corresponding to the annular projection 333 of the first embodiment) to be fitted in the fitting port 324a' or 324b'. The annular part 332' defines an opening as an extension of the first communication passage A' or the second communication passage B' defined by the conduit connection portion 331', and holes, through which bolts are inserted, are bored in an area facing the peripheral edge of the open end of the body portion 320'. With this arrangement, the annular part 332' is brought into tight contact with the gasket G1' of the body portion 320' (the peripheral edge of the open end of the fitting port 324a' or 324b') by screwing screws, which have been set in the holes, into threaded holes (not illustrated) formed in an outer circumference of the fitting port 324a' or 324b', so that the sealing effect against the body portion 320' can be ensured. The annular fitting part 333' is designed to be guided along the inner circumference of the body portion 320' while being kept fit in the fitting port 324a' or 324b', so that the sub-frame 33' (substantially the seat member 30' and the first communication passage A' or the second communication passage B') can be positioned relative to the main frame 32'.

The peripheral edge of an open end of the annular fitting part 333' is formed with an annular stepped portion 334', into which the annular seat member 30' is fitted. With this arrangement, the seat member 30' is disposed on the peripheral edge of the open end of the first communication passage A' or the second communication passage B' located inside of the housing 3' when the sub-frame 33' has been attached to the main frame 32'. The conduit connection portion 331' of the sub-frame 33' has one end connected to the peripheral edge of the opposite open end of the annular part 332'. Thus, with the sealing portion 330' attached to the body portion 320', the first communication passage A' or B' faces the opposite first communication passage A' or second communication passage B' and the center line of the first and second communication passages A', B' is oriented orthogonal to the rotational axis L' of the valve body 2'. The opposite end of the conduit connection portion 331' is also formed with a flange 335' for connection to a conduit.

Thus, the housing 3' defines the valve-body accommodation space 31' for accommodating therein the valve body 2' by attaching the sub-frames 33', 33' to the main frame 32'.

As described above, the first shaft 4' extends into the housing 3' (the first-shaft insertion portion 321'), and has one end located within the housing 3' and formed with the transmission part 40' that is inserted between the pin members 23', 23' of the valve body 2', thereby transmitting rotational force about the rotational axis L' to the valve body 2' via the pin members 23', 23'. Specifically, the transmission part 40' has a substantially rectangular shape in cross section with two pairs of flat surfaces extending substantially parallel to each other on an outer circumference and located opposite to each other with the axis therebetween. The two pairs of flat surfaces are formed with a distance therebetween, which distance being substantially equal to or slightly smaller than the distance between the pin members 23, 23. The transmission part 40' is inserted into an area surrounded by the four pin members 23', ... disposed in a frame-like arrangement so as to have each flat surface facing the corresponding pin member 23, thereby enabling the transmission of the rotational force about the rotational axis L', and hence enabling tilting of the valve body 2' towards and away from the seat member 30' around a contacting portion of the pin member 23' and the corresponding flat surface while the non-through opening portion of the valve body 2' is kept facing the seat members 30', 30' (or is kept facing any one of the two communication passages A', B' other than the given communication passage C').

The first shaft 4' is designed to be connectable to a driving motor (not illustrated) such as a pulse motor through its one end, so that the first shaft 4' can be rotated about the rotational axis L' (the rotational axis L' of the valve body 2') by the driving force of the driving motor.

As illustrated in FIGS. 5A and 5B, the second shaft 5' extends into the housing 3' (second-shaft insertion portion 322'), and has one end located within the housing 3' and formed with the pressing part 50' that projects radially outwardly from at least a portion of the outer circumference of the second shaft 5'. Describing more specifically the second shaft 5', the second shaft 5' is made up of a shaft body 51' extending into the housing 3', and the pressing part 50' projecting from a part of the outer circumference of the shaft body 51'. The pressing part 50' projects from the outer circumference of the shaft body 51', and therefore is different in rotation radius from the shaft body 51', in the same manner as the first embodiment. Thus, when the second shaft 5' is rotated about the rotational axis L', the pressing part 50' contacts and then presses the pressed parts 24a', 24b' of the valve body 2'.

In this embodiment, the pressed parts 24a', 24b' of the valve body 2' are made up of the first pressed parts 24a', 24b' and the second pressed part 26', and the second pressed part 26' has a circular arc shape in a plan view. With this arrangement, the pressing part 50' acts as a pressing part (corresponding to the second pressing part 52 of the first embodiment) for moving the valve body 2' away from the seat members 30', 30'. The pressing part 50' of this embodiment is formed by a rod member joined to the shaft body 51' to have an axis substantially parallel to the shaft body 51', in the same manner as the first embodiment.

In addition to the pressing part 50', the second shaft 5' of this embodiment has positioning members 53' for positioning the valve body 2' away from the seat members 30', 30'.

The positioning members 53' project radially outwardly from the shaft body 51' and disposed at an angular distance of 90° relative to the pressing part 50' around the shaft body 51'. One of the positioning members 53' abuts the one first pressed part 24a' while the pressing part 50' is kept in contact with the second pressed part 26' (cf. FIG. 7B), and abuts the other first pressed part 24b' while the pressing part 50' keeps pressing the one first pressed part 24a' (cf FIG. 7D). Another positioning part 53' abuts the other first pressed part 24b' while the pressing part 50' is kept in contact with the second pressed part 26' (cf. FIG. 6B), and abuts the one first pressed part 24a' while the pressing part 50' keeps pressing the other first pressed part 24b' (cf. FIG. 6D).

Unlike the first embodiment, the ball valve 1' of this embodiment is a three-way valve for changing the fluid communication passages. Accordingly, the pressing part 50' presses the other first pressed part 24b' towards the second communication passage B' while the given communication passage C' is kept in communication with the adjacent first communication passage A', thereby displacing the valve body 2' towards the seat member 30' of the second communication passage B'. Also, the pressing part 50' presses the one first pressed part 24a' towards the first communication passage A' while the given communication passage C' is kept in communication with the adjacent second communication passage B', thereby displacing the valve body 2' towards the seat member 30' of the first communication passage A'. Whereby, the valve body 2' is brought into tight contact with the seat member 30' disposed on the peripheral edge of the open end of the first communication passage A' or the second communication passage B' which is kept out of communication with the communication hole 20' (given communication passage C'). Thus, one of the communication passages A' and B' is shut off to constitute a single communication passage.

Now, the description will be made for an operation of the thus structured ball valve 1' of this embodiment.

Figure 6A:
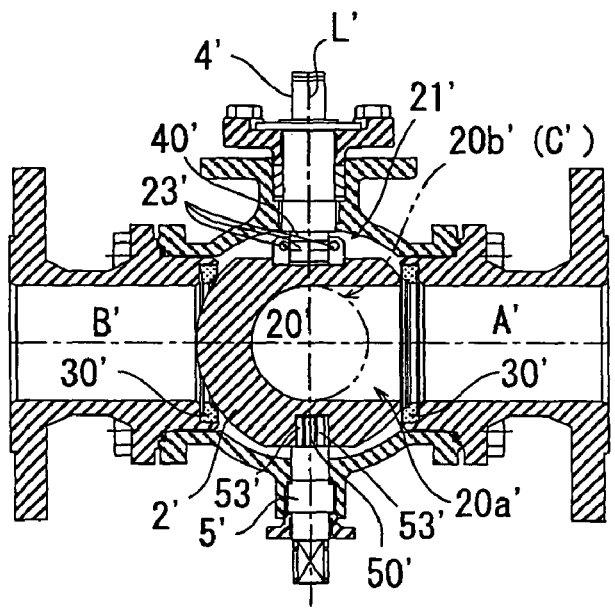
FIGS. 6A to 6D are explanatory views for explaining an operation of the ball valve (three-way valve) of the second embodiment. Specifically.
Figure 6B:
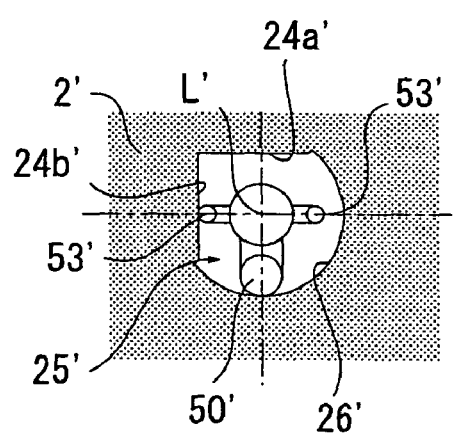

As illustrated in FIG. 6A, when the valve body 2' is rotated about the rotational axis L' so as to have the opposite open ends of the communication hole 20' facing both the given communication passage C' and the first communication passage A', the non-through opening portion of the valve body 2' is brought into a position at which it faces the second communication passage B' adjacent to the given communication passage C'. As illustrated in FIG. 6B, at this position, the other first pressed part 24b' is positioned close to the second communication passage B' while extending in a direction orthogonal to the rotational axis L' of the valve body 2' and the axis of the second communication passage B'. Also, the other positioning part 53' abuts the first positioned part 24b' and the pressing part 50' abuts the second pressed part 26'. At this position, neither the pressing part 50' nor the positioning part 53' presses the pressed parts 24a', 24b', 26', and thus clearances are formed between the valve body 2' and the seat members 30', 30'.

Figure 6C:
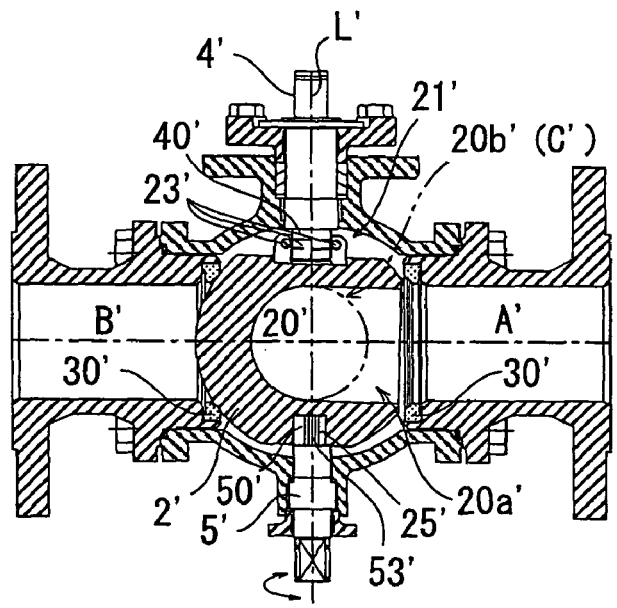
Figure 6D:
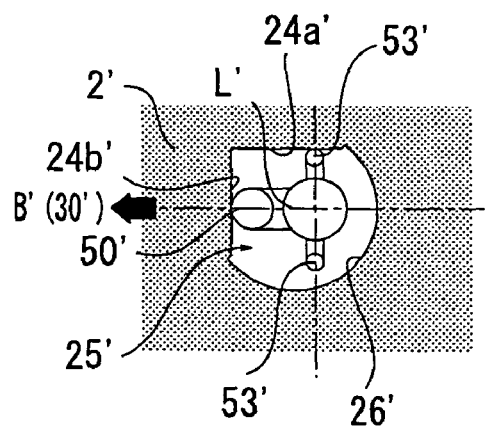

As illustrated in FIG. 6C, when the second shaft 5' is rotated to move the pressing part 50' towards the other first pressed part 24b', the other positioning part 53' abuts the one first pressed part 24a' while the pressing part 50' presses the other first pressed part 24b'. This pressing action of the other first pressed part 24b' through the pressing part 50' allows the valve body 2' to tilt towards the seat member 30' so that the non-through opening portion of the valve body 2' is brought into tight (pressing) contact with the seat member 30', thereby shutting off the second communication passage B'. Thus, the given communication passage C' is brought into communication with the first communication passage A' via the communication hole 20'.

When the fluid communication passage is to be changed, the second shaft 5' is rotated 180°, so as to allow the pressing part 50' to press the second pressed part 26', which is located opposite to the other first pressed part 24b', thereby moving the valve body 2' away from the seat member 30'. When the pressing part 50' has reached a position at which it has pressed the second pressed part 26' (more specifically, a portion facing the first pressed parts 24a', 24b') to the limit, given clearances are defined between the valve body 2' and the seat members 30', 30'. Then, the second shaft 5' is reversely rotated (−90°) into a position at which it does not affect on the rotation of the valve body 2', as illustrated in FIG. 6B.

Figure 7A:
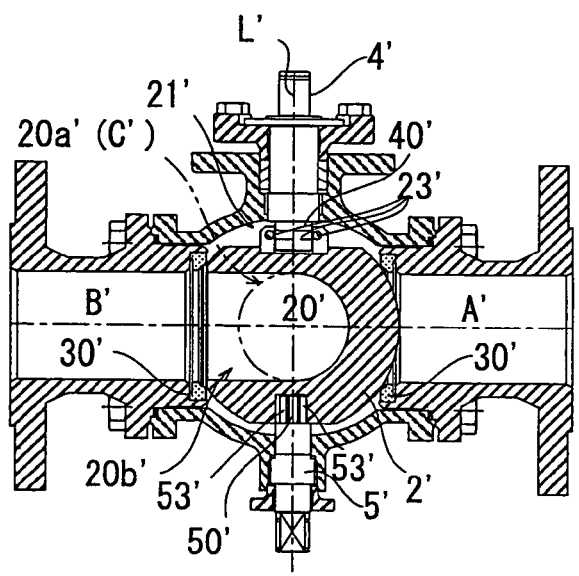
FIGS. 7A to 7D are explanatory views for an operation of the ball valve (three-way valve) of the second embodiment. Specifically.
Figure 7B:
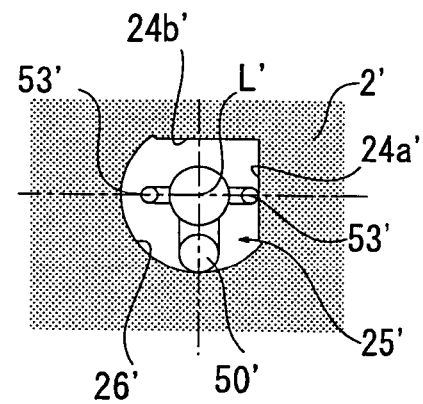

As illustrated in FIG. 7A, when the valve body 2' is rotated about the rotational axis L' so as to have the opposite open ends of the communication hole 20' facing both the given communication passage C' and the second communication passage B', the non-through opening portion of the valve body 2' is brought into a position at which it faces the first communication passage A' adjacent to the given communication passage C'. At this position, as illustrated in FIG. 7B, the first pressed parts 24a', 24b' are located close to the first communication passage A' while extending in a direction orthogonal to the rotational axis L' of the valve body 2' and the axis of the first communication passage A', and the one positioning part 53' abuts the one first pressed part 24a' while the pressing part 50' abuts the second pressed part 26'. At this position, neither the pressing part 50' nor the positioning members 53' presses the pressed parts 24a', 24b', 26', and thus clearances are formed between the valve body 2' and the seat members 30', 30'.

Figure 7C:
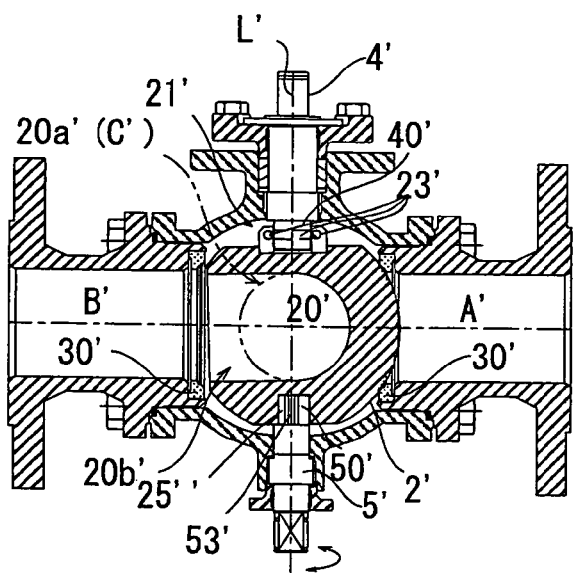
Figure 7D:
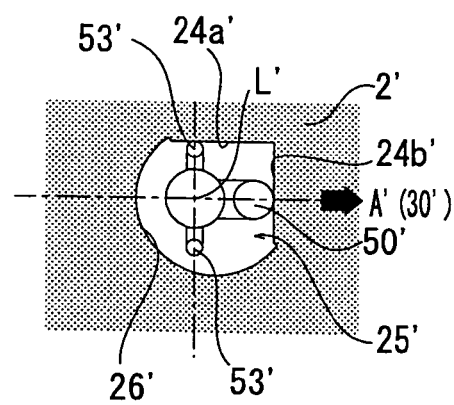
Figure 8:
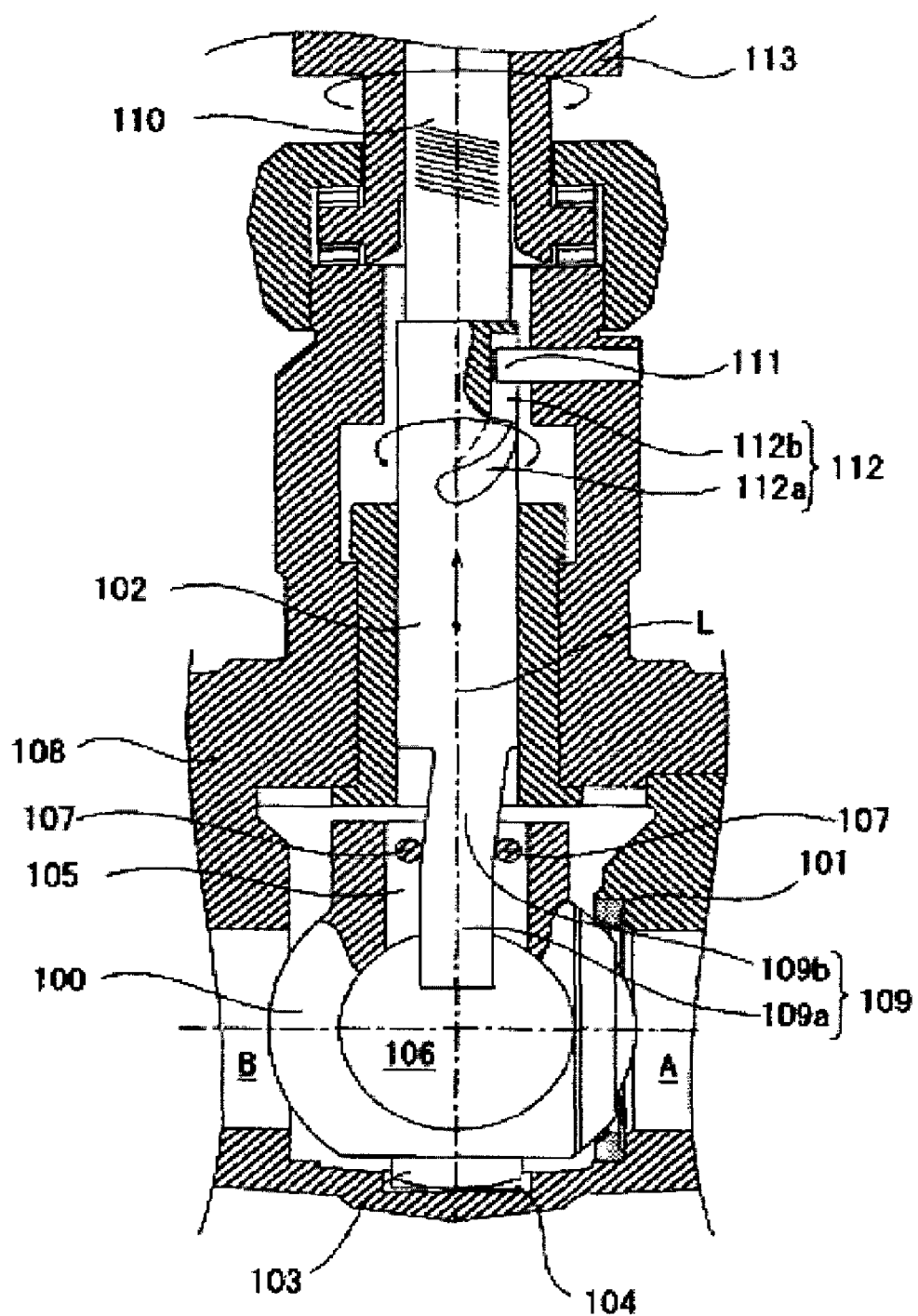
FIG. 8 is a vertical cross sectional view of a portion of a conventional ball valve.

As illustrated in FIG. 7C, when the second shaft 5' is rotated to move the pressing part 50' towards the one first pressed part 24a', the one positioning member 53' abuts the other first pressed part 24b' while at the same time the pressing part 50' presses the one first pressed part 24a'. This pressing action of the one first pressed part 24a' through the pressing part 50' allows the valve body 2' to tilt towards the seat member 30' so that the non-through opening portion of the valve body 2' is brought into tight (pressing) contact with the seat member 30' while applying a surface pressure, thereby shutting off the first communication passage A'. Thus, the given communication passage C' is brought into communication with the second communication passage B' via the communication hole 20'.

When the fluid communication passage is to be changed, the second shaft 5' is rotated 180°, so as to allow the pressing part 50' to press the second pressed part 26', which is located opposite to the other first pressed part 24b', thereby moving the valve body 2' away from the seat members 30', 30'. In this operation, too, when the pressing part 50' has reached a position at which it has pressed the second pressed part 26' (more specifically, a portion facing the other first pressed part 24b') to the limit, given clearances are formed between the valve body 2' and the seat members 30', 30'. Then, in the same manner as mentioned above, the valve body 2' is rotated, after the second shaft 5' is reversely rotated (−90°) into a position at which it does not affect on the rotation of the valve body 2', as illustrated in FIG. 7B.

As described above, the ball valve 1' of this embodiment has the first and second shafts 4', 5' that are not moved forward and backward in the axial direction, but merely rotated, which structure contributes to the reduction of the entire size of the ball valve 1' and reduction in space to be occupied for the installation and operation. Since the rotation of the valve body 2' and the movement of the valve body 2' towards and away from the seat members 30', 30' can be achieved only by the rotation of the first shaft 4' and the second shaft 5', it is possible to easily and instantly open and close the communication passages, and change the direction of fluid flow.

Since the valve body 2' is connected to the first shaft 4' in such a manner as to be tiltable towards the seat members 30', 30' while having the non-through opening portion facing the seat members 30', 30', the valve body 2' is tilted relative to the first shaft 4' and hence brought into tight contact with the seat members 30', 30' when the pressing part 50' of the second shaft 5' has pressed the pressed parts 24a', 24b' of the valve body 2'. In addition, a reaction force caused by this tight contact of the valve body 2' to the seat members 30', 30' is received by the first shaft 4'. Whereby, the force acts towards both the first shaft 4' and the second shaft 5' so that the valve body 2' more tightly contacts the seat members 30', 30'. Thus, high sealing performance can be achieved.

Since the ball valve 1' of this embodiment has the first shaft 4' and the second shaft 5' that are not moved forward and backward in the axial direction, the first and second shafts 4', 5' are not moved into and out of the communication hole 20' of the valve body 2' for fluid communication. Therefore, even when a valve is the above-described three-way valve, which enables constant communication of any two of the communication passages (e.g., the communication passages A', B'), the original performance of the three-way valve can be satisfactorily achieved without blocking fluid flow communication within the communication hole 20'.

It is a matter of course that the ball valve of the present invention is not necessarily limited to any of the above embodiments and may be subjected to modification, change or the like within the scope of the present invention.

In the first and second embodiments, the shaft receiving portion 21, 21' for receiving the transmission part 40, 40' of the first shaft 4, 4' is provided above the valve body 2, 2', and the pin members 23, . . . , 23', . . . are disposed in the shaft receiving portion 21, 21' with a given interval therebetween. With this arrangement, the valve body 2, 2' is tiltable with the non-through opening portion of the valve body 2, 2' kept facing the seat member 30, 30', while at the same time the rotational force about the rotational axis L, L' can be transmitted to the valve body 2, 2'. Alternatively, it is possible to employ an arrangement, in which the valve body 2, 2' is connected to one end of the first shaft 4, 4' located within the housing 3, 3' with a pin so as to enable the rotational force about the rotational axis L, L' to be transmitted to the valve body 2, 2' and enable the valve body 2, 2' to be tiltable about the pin.

However, in the case similar to the second embodiment, in which the ball valve 1' is a three-way valve and the valve body 2' is rotated 90° about the rotational axis L' to change the fluid communication passage, the valve body 2' is required to be tiltable in two axes orthogonal to each other. Accordingly, the valve body 2' may be connected to the first shaft 4' via a universal joint, or another arrangement is employed in which a connection member is interposed between the valve body 2' and the first shaft 4', the valve body 2' is connected to the connection member with a first pin member extending in a direction orthogonal to the rotational axis L', and the connection member is connected to the first shaft 4' with a second pin member extending in a direction orthogonal to the first pin member. With this arrangement, the rotational force about the rotational axis L' can be transmitted to the valve body 2', and the valve body 2' can be tilted about two axes orthogonal to each other. Thus, the same advantage as that of the second embodiment can be obtained.

In the first and second embodiments, a rod member is joined to the shaft body 51, 51' to form the pressing part 50, 50' which projects radially outwardly from a part of the circumference of the second shaft 5, 5'. However, the present invention is not necessarily limited to this arrangement. For example, the second shaft 5, 5' may be formed by integrally forming the pressing part 50, 50' with the shaft body 51, 51'. Specifically, it is possible to employ an arrangement, in which the second shaft 5 5' has one end formed into an eccentric-cam like shape to partially form a portion having a different rotational radius, in which a part of the portion having a maximum rotational radius acts as the pressing part 50, 50'. The pressed parts 24, 24a', 24b' to be pressed by the pressing part 50, 50' of the second shaft 5, 5' are not necessarily formed by the portions of the inner circumference of the recess 25, 25' formed in the valve body 2, 2'. For example, a projection is formed on a lower side of the valve body 2, 2', which acts as the pressed parts 24, 24a', 24b'. In this case, too, the pressed parts 24, 24a', 24b' are formed so as to allow the pressing force of the pressing part 50, 50' to act towards the seat member 30, 30', while the non-through opening portion of the valve body 2, 2' is kept facing the seat member 30, 30'.

In the first and second embodiments, the valve body 2, 2' is connected to the first shaft 4, 4' so as to be tiltable. However, the present invention is not necessarily limited to this arrangement. Various modifications may be made, as long as the connection between the first shaft 4, 4' and the valve body 2, 2' enables the rotational force of the first shaft 4, 4' to be transmitted to the valve body 2, 2', and the valve body 2, 2' can be moved towards and away from the seat member 30, 30'. For example, the valve body 2, 2' is provided with the shaft receiving portion 21, 21', in which two pin members 23, . . . , 23', . . . are disposed to extend in a direction enabling the valve body 2, 2' to be moved towards and away from the seat member 30, 30', and the transmission part 40, 40' of the first shaft 4, 4' is inserted between the pin members 23, . . . , 23', . . . In this case, since the movement of the valve body 2, 2' in a direction in which the pin members 23, . . . , 23', . . . are extended, or the movement of the valve body 2, 2' towards and away from the seat member 30, 30' is not restricted, the valve body 2, 2' is displaced by the pressing force of the pressing part 50, 50' in a direction in which the pin members 23, . . . , 23', . . . are extended, and thus can be brought into tight contact with the seat member 30, 30'. However, with this arrangement, unlike the first and second embodiments, the reaction force of the pressing force by the pressing member 50, 50' does not act towards the first shaft 4, 4' and therefore the sealing performance is slightly deteriorated. From this point of view, it is preferable to employ an arrangement in which the reaction force of the pressing force of the pressing part 50, 50' acts on the first shaft 4, 4' via the valve body 2, 2'.

In the first embodiment, the annular seat member 30 is disposed on the peripheral edge of the inside open end of one of the two communication passages A, B (the communication passage A in the first embodiment), and the valve body 2 is displaced towards the seat member 30 by the pressing force of the pressing part 50. Alternatively, it is possible to employ an arrangement, in which the seat members 30 are respectively disposed on the peripheral edges of the each-other facing inside open ends of the two coaxially arranged communication passages A, B, and the pressing part and the pressed part 24 are formed in the same manner as the second embodiment. In this case, the communication passages A, B can be shut off by pressing the pressed part 24 of the valve body 24 towards any one of the seat members 30 by the pressing part 50 while the non-through opening portion of the valve body 2 is kept facing a communication passage.

In the first embodiment, the two communication passages A, B are formed in the housing 3 to be coaxial with each other. Alternatively, it is possible to employ an arrangement, in which two communication passages A, B are formed in the housing 3 at a given angular distance from each other around the rotational axis L of the valve body 2, the communication hole 20 of the valve body 2 is formed in a curved or bent shape on an imaginary surface orthogonal to the rotational axis L so that the two communication passages A, B formed in the housing 3 can be communicated with each other via the communication hole 20. In this case, too, when the seat member 30 is disposed on the peripheral edge of the inside open end of one of the communication passages A, B (the communication passage A in the first embodiment) and the pressed part 24 of the valve body 2 and the pressing part 50 of the second shaft 5 are formed in the same manner as those of the first embodiment, the valve body 2 can be rotated by the rotation of the first shaft 4 while being kept out of contact or substantial contact with the seat member 30, and the valve body 2 can be kept in tight contact with the seat member 30 by the pressing of the pressed part 24 by the pressing part 50, thereby enabling shut-off of the communication passage.

In the first embodiment, the second shaft 5 is provided with the second pressing part 52 while the valve body 2 is provided with the second pressed part 26, and the valve body 2, which is kept in tight contact with the seat member 30, is forcibly moved away from the seat member 30 by the pressing of the second pressed part 26 by the second pressing part 52. However, the present invention is not necessarily limited to this arrangement. It is possible to employ an arrangement, in which only the first pressing part 50 (the pressing part 50) and the first pressed part 24 (the pressed part) are provided to press the valve body 2 towards the seat member 30. Specifically, as long as the valve body 2 is tiltably connected to the first shaft 4, the valve body 2 can be moved away from the seat member 30 by the effect of the valve body's own weight when the pressed part 24 is released from the pressure of the first pressing part 50 upon rotation of the second shaft 5. Accordingly, the second pressing part 52 and the second pressed part 26 for forcibly moving the valve body 2 away from the seat member 30 may be provided according to needs and circumstances, in consideration of the connection form between the valve body 2 and the first shaft 4, whether the valve body 2 can be easily displaced or not, or other factors.

In the first embodiment, the valve body 2 is rotated while being kept out of contact or substantial contact with the seat member 30. In this respect, when taking into account wearing of the seat member 30, it is a matter of course that when the valve body 2 is being rotated, it is preferably kept out of contact with the seat member 30. Further, in the second embodiment, when the valve body 2' is being rotated, a clearance is formed between the valve body 2' and the seat member 30' to keep the valve body 2' out of contact with the seat member 30'. In this respect, in the same manner as the first embodiment, it is possible to employ an arrangement, in which the valve body 2' is rotated while being kept in substantial contact with the seat member 30' (at least a partial contact to such an extent as not to apply surface pressure causing significant wearing of the seat member 30'). However, it is a matter of course that when the valve body 2' is being rotated, it is preferably kept out of contact with the seat member 30'.

In the second embodiment, the communication passages A', B' adjacent to each other with the given communication passage C' therebetween around the rotational axis L' are formed at an angular distance of 90° from the given communication passage C'. The present invention is not necessarily limited to this arrangement. For example, the three communication passages A', B', C' may be radially disposed around the rotational axis L' of the valve body 2'. In this case, the three communication passages A', B', C' may be arranged at an even or uneven angular pitch around the rotational axis L' of the valve body 2'. In both arrangements, it is a matter of course that the communication hole 20' is designed to be capable of changing from a position, at which the given communication passage C' is communicated with the first communication passage A' located adjacent thereto, to a position, at which the given communication passage C' is communicated with the second communication passage B' located adjacent thereto, or vice versa. In this case, too, the seat members 30', 30' are respectively disposed on the peripheral edges of the inside open ends of the two communication passages A', B' other than the given communication passage C', and the pressed part 24' is provided on the valve body 2' so as to allow the pressing force of the pressing part 50' to act towards, or allow the valve body 2' to be displaced towards one of the seat members 30', 30', to which the non-through opening portion of the valve body 2' is kept facing.

Since the valve having the above structure is generally called as a ball valve, a valve of the present invention is termed as the ball valve 1, 1'. However, the valve body 2, 2' is not necessarily limited to a spherical shape, as long as the valve body 2, 2' is rotatable about the given rotational axis L, L', the communication hole 20, 20' is formed through the valve body 2, 2' along an imaginary surface orthogonal to or substantially orthogonal to the rotational axis L, L', and the non-through opening portion 20, 20' is designed to be capable of being kept in tight contact with the seat member 30, 30'.

This specification is by no means intended to restrict the present invention to the preferred embodiments set forth therein. Various modifications to the ball valve, as described herein, may be made by those skilled in the art without departing from the spirit and scope of the present invention as defined in the appended claims.

What is claimed is:

1. A ball valve comprising:
   a valve body that is rotatable about a given rotational axis and has a communication hole extending through the valve body along an imaginary surface orthogonal or substantially orthogonal to the rotational axis,
   a housing that accommodates the valve body and has at least two communication passages that each have inside and outside open ends and are communicated with each other through the communication hole, and
   an annular seat member that is disposed on the peripheral edge of each of at least one of inside open ends of the at least two communication passages, wherein
   the valve body is rotatable while being kept out of contact or substantial contact with the seat member,
   the valve body has a non-through opening portion and is movable towards and away from the seat member while the non-through opening portion is kept facing the seat member, so that the non-through opening portion is brought into tight contact with the seat member, thereby shutting off fluid communication between the at least two communication passages,
   said ball valve further comprising:
   a first shaft that extends into the housing and is connected to the valve body so as to be capable of transmitting rotational force about the rotational axis to the valve body, and
   a second shaft that extends into the housing to be oppositely located to the first shaft with the valve body therebetween and is rotatable about an axis coaxial or parallel with the first shaft, and has a pressing part that projects radially outwardly from at least a part of the outer circumference of a first end of the second shaft located inside the housing,
   wherein the second shaft is capable of rotating independently of the first shaft, wherein the valve body has a pressed part that is pressed by the pressing part towards the seat member while the non-through opening portion of the valve body is kept facing the seat member, and
   wherein the valve body is tilted around a portion close to the first shaft.

2. The ball valve according to claim 1, wherein the valve body is connected to the first shaft in such a manner as to be tiltable towards the seat member while the non-through opening portion is kept facing the seat member.

3. The ball valve according to claim 1, wherein the at least two communication passages comprise two communication passages formed in the housing with a distance from each other around the rotational axis, and the seat member is disposed on the peripheral edge of the inside open end of each of at least one of the two communication passages.

4. The ball valve according to claim 1, wherein the at least two communication passages comprise three communication passages formed in the housing with a distance from each other around the rotational axis, the communication hole permits fluid communication between a given one of the communication passages and a first one of the residual communication passages adjacent to the given communication passage around the rotational axis, and upon the rotation of the valve body about the rotational axis, the communication hole permits fluid communication between the given communication passage and a second one of the residual communication passages adjacent to the given communication passage around the rotational axis, and the seat member is disposed on the peripheral edge of the inside open end of each of the communication passages other than the given communication passage.

5. A ball valve comprising:
   a valve body that is rotatable about a given rotational axis and has a communication hole extending through the valve body along an imaginary surface orthogonal or substantially orthogonal to the rotational axis,
   a housing that accommodates the valve body and has two communication passages that each have inside and outside open ends and are communicated with each other through the communication hole, and
   an annular seat member that is disposed on the peripheral edge of each of at least one of the inside open ends of the two communication passages, wherein
   the valve body is rotatable while being kept out of contact or substantial contact with the seat member,
   the valve body has a non-through opening portion and is movable towards and away from the seat member while the non-through opening portion is kept facing the seat member, so that the non-through opening portion is brought into tight contact with the seat member, thereby shutting off fluid communication between the communication passages,
   said ball valve further comprising:
   a first shaft that extends into the housing and is connected to the valve body so as to be capable of transmitting rotational force about the rotational axis to the valve body, and
   a second shaft that extends into the housing to be oppositely located to the first shaft with the valve body therebetween and is rotatable about an axis coaxial or parallel with the first shaft, and has a pressing part that projects radially outwardly from at least a part of the outer circumference of a first end of the second shaft located inside the housing, wherein the second shaft is capable of rotating independently of the first shaft, wherein the valve body has a pressed part that is pressed by the pressing part towards the seat member while the non-through opening portion of the valve body is kept facing the seat member, and wherein the valve body is tilted around a portion close to the first shaft.

6. A ball valve comprising:

a valve body that is rotatable about a given rotational axis and has a communication hole extending through the valve body along an imaginary surface orthogonal or substantially orthogonal to the rotational axis, a housing that accommodates the valve body and has a first communication passage, a second communication passage and a third communication passage that are formed around the rotational axis with a distance from each other with the third communication passage located between the first and second communication passages, wherein the third communication passage is selectively communicated with the first and second communication passages through the communication hole, said first, second and third communication passages each having inside and outside open ends, annular seat members that are respectively disposed on the peripheral edges of the inside open ends of the first and second communication passages, wherein the valve body has a non-through opening portion and is rotatable to a first position and a second position while being kept out of contact or substantial contact with the seat members, the valve body is movable towards and away from the seat members while the non-through opening portion is kept facing the seat member so that at the first position, the non-through opening portion is brought into tight contact with the seat member of the second communication passage, thereby permitting fluid communication between the first communication passage and the third communication passage via the communication hole while shutting off fluid communication between the second communication passage and the third communication passage, and at the second position, the non-through opening portion is brought into tight contact with the seat member of the first communication passage, thereby permitting fluid communication between the second communication passage and the third communication passage via the communication hole while shutting off fluid communication between the first communication passage and the third communication passage, said ball valve further comprising:

a first shaft that extends into the housing and is connected to the valve body so as to be capable of transmitting rotational force about the rotational axis to the valve body, and a second shaft that extends into the housing to be oppositely located to the first shaft with the valve body therebetween and is rotatable about an axis coaxial or parallel with the first shaft, and has a pressing part that projects radially outwardly from at least a part of the outer circumference of a first end of the second shaft located inside the housing, wherein the second shaft is capable of rotating independently of the first shaft, wherein the valve body has a pressed part that is pressed by the pressing part towards the seat member while the non-through opening portion of the valve body is kept facing the seat member, and wherein the valve body is tilted around a portion close to the first shaft.

* * * * *